United States Patent
Weingartner

(10) Patent No.: US 10,115,398 B1
(45) Date of Patent: Oct. 30, 2018

(54) SIMPLE AFFIRMATIVE RESPONSE OPERATING SYSTEM

(71) Applicant: Intelligently Interactive, Inc., New York, NY (US)

(72) Inventor: Eric H. Weingartner, New York, NY (US)

(73) Assignee: Intelligently Interactive, Inc., New York, NY (US)

(*) Notice: Subject to any disclaimer, the term of this patent is extended or adjusted under 35 U.S.C. 154(b) by 0 days.

(21) Appl. No.: 16/004,127

(22) Filed: Jun. 8, 2018

Related U.S. Application Data

(63) Continuation of application No. 15/480,271, filed on Apr. 5, 2017, which is a continuation-in-part of application No. 15/441,742, filed on Feb. 24, 2017, now Pat. No. 9,983,849, which is a continuation of application No. 15/204,981, filed on Jul. 7, 2016, now Pat. No. 9,619,202.

(51) Int. Cl.
| | |
|---|---|
| *G10L 13/08* | (2013.01) |
| *G10L 15/18* | (2013.01) |
| *G10L 15/22* | (2006.01) |
| *H04L 12/28* | (2006.01) |
| *G06F 17/30* | (2006.01) |
| *H04L 29/08* | (2006.01) |
| *H04L 12/58* | (2006.01) |

(52) U.S. Cl.
CPC ........ *G10L 15/22* (2013.01); *G06F 17/30864* (2013.01); *G10L 13/08* (2013.01); *G10L 15/1815* (2013.01); *H04L 12/2827* (2013.01); *H04L 67/02* (2013.01); *G10L 2015/223* (2013.01); *H04L 51/02* (2013.01)

(58) Field of Classification Search
CPC ......... G10L 15/22; G10L 15/30; G10L 15/26; G10L 13/00; G10L 13/02; G10L 13/04
See application file for complete search history.

(56) References Cited

U.S. PATENT DOCUMENTS

| | | | |
|---|---|---|---|
| 5,924,068 A * | 7/1999 | Richard | G10L 13/00 345/901 |
| 7,353,176 B1 * | 4/2008 | Baray | G10L 15/22 704/257 |
| 7,711,569 B2 * | 5/2010 | Takeuchi | G06F 17/30654 704/1 |

(Continued)

*Primary Examiner* — Samuel G Neway
(74) *Attorney, Agent, or Firm* — Weitzman Law Offices, LLC

(57) ABSTRACT

A simple affirmative response operating system is disclosed for selecting a data item from a list of options using a unique affirmative action. Text-based labels in a listing of content are converted to speech using an embedded text-to-speech engine and an audio output of a first converted label is provided. A listening state is entered into for a predefined pause time to await receipt of the simple affirmative action. If the simple affirmative action is performed during the predefined pause time, an associated content item is selected for output. If the simple affirmative action is not performed during the predefined pause time, an audio output of a next converted label in the list is provided. This protocol may be used to control a variety of computing devices safely and efficiently while a user is distracted or disabled from using traditional input methods.

18 Claims, 12 Drawing Sheets

(56) References Cited

U.S. PATENT DOCUMENTS

| | | | | |
|---|---|---|---|---|
| 8,438,485 | B2* | 5/2013 | Kulis | G06F 3/167 |
| | | | | 704/270.1 |
| 9,111,534 | B1* | 8/2015 | Sylvester | G10L 13/00 |
| 9,619,202 | B1* | 4/2017 | Weingartner | G06F 3/0482 |
| 2002/0055844 | A1* | 5/2002 | L'Esperance | H04M 1/271 |
| | | | | 704/260 |
| 2004/0260562 | A1* | 12/2004 | Kujirai | G01C 21/3608 |
| | | | | 704/275 |
| 2005/0203740 | A1* | 9/2005 | Chambers | 704/254 |
| 2006/0116880 | A1* | 6/2006 | Gober | G10L 15/28 |
| | | | | 704/270 |
| 2008/0071544 | A1* | 3/2008 | Beaufays | G06F 17/30867 |
| | | | | 704/270.1 |
| 2008/0300886 | A1* | 12/2008 | Patch | 704/275 |
| 2010/0312547 | A1* | 12/2010 | Van Os | G10L 15/26 |
| | | | | 704/9 |
| 2012/0089392 | A1* | 4/2012 | Larco | G10L 15/063 |
| | | | | 704/231 |
| 2013/0307771 | A1* | 11/2013 | Parker | G06F 3/013 |
| | | | | 345/158 |
| 2016/0071509 | A1* | 3/2016 | Zhao | G10L 13/04 |
| | | | | 704/260 |

\* cited by examiner

SIMPLE AFFIRMATIVE RESPONSE OPERATING SYSTEM

CROSS-REFERENCE TO RELATED APPLICATIONS

This application is a continuation of co-pending U.S. patent application Ser. No. 15/480,271, filed Apr. 5, 2017 and titled "SIMPLE AFFIRMATIVE RESPONSE OPERATING SYSTEM"; which is a continuation-in-part of U.S. patent application Ser. No. 15/441,742, filed Feb. 24, 2017, titled "VOICE COMMAND-DRIVEN DATABASE", and granted as U.S. Pat. No. 9,983,849; which is itself a continuation of U.S. patent application Ser. No. 15/204,981, filed Jul. 7, 2016, titled "VOICE COMMAND-DRIVEN DATABASE", and granted as U.S. Pat. No. 9,619,202. Each of these three parent applications are incorporated herein by reference in their entirety.

FIELD OF INVENTION

This disclosure relates generally to operating systems, and more specifically, to a simple response-driven system for initializing and controlling a variety of applications.

BACKGROUND

Modern computing devices are able to access a vast quantity of information, both via the Internet and from other sources. Functionality for such devices is increasing rapidly, as mobile computing devices are able to run software applications to perform various tasks and provide different types of information. However, modern computing devices primarily rely upon output content to a user via a visual screen, and acknowledging user only via a screen. As a result, users who wish to operate a computing device either while concurrently performing other distracting or strenuous activities (e.g., operating a vehicle, riding a bicycle, exercising, etc.), are visually impaired or disabled in some manner, or simply wish to rest their eyes while interacting with the device, may have difficulty interfacing effectively with their devices due to limited or no ability to read a display screen or physically interact with the device using existing physical input methods.

Some modern computing devices include functionality that enables a user to interact with the device using spoken natural language, rather than employing a conventional manual user interface. Most of the popular natural language voice recognition systems for mobile computing devices and consumer products today, such as Apple Inc.'s Siri® and Amazon.com, Inc.'s Amazon Echo® utilize command-driven ASR systems that allow for the spoken interaction to control the system on the mobile device. Existing systems do not provide a sustained interaction predicated by the first action initiated by the user, but rather respond with a single result—for example, playing a song, or providing a single fact that is the answer to a question.

Command-driven ASR systems typically rely on a limited vocabulary list of words at any given time during the course of interaction by the user and may be part of an embedded system within a mobile device that does not require a remote server to translate the STT to control the system. In such embedded systems, the user is predominantly accessing a limited type of data (e.g., phone numbers, music, etc.) that is generally known to the user at the time of a voice command input.

Systems that rely on commands, however, shift the burden to the user to remember different commands or keywords in a dynamic implementation of the vocabulary list, thus increasing the difficulty for the user to know, remember or guess the commands to enable useful control and interaction. For this reason, conventional embedded, command-driven ASR systems are suitable for limited applications in mobile devices (e.g., retrieving phone numbers or email addresses, selecting music, or requesting directions to a specific address) where the vocabulary list is limited, finite, and generally known by the user.

Conventional command-driven, embedded ASR systems are not suitable for more complex applications requiring a large vocabulary due to the limited computational, memory and battery resources of mobile computing devices. As the vocabulary required for responses increases or varies, the accuracy of the speech recognition decreases in embedded ASR systems. In addition, there are many applications that require large vocabularies, oftentimes without the ASR system or the user knowing in advance what vocabulary is required.

Another area that adds complexity is the interaction with an ASR system using the microphone and speaker of a device. Because the microphone is typically close to the speaker on most mobile devices, the ASR system can erroneously act upon its own TTS or spoken output or ambient sounds if simultaneously "listening" for a voice command from the user. Additionally, it can be a challenge for the user to know when to speak while interacting with a TTS list and relying on an erratic pause delay in the TTS between varied-length content. The user doesn't know when the TTS of the individual content has concluded without a delay in their response time. The pause length between the TTS of content can be set to address the time needed for the user, but still requires a lot of attention for the user to respond quickly enough to speak to initiate a selection or increase the overall time it takes for the user to navigate through the list of content.

To address the spoken voice feedback loop, some digital personal assistants utilize ASR systems that are always listening but require the user to use a keyword to let the system know that the user is initiating voice interaction. This creates awkward interaction because the user cannot continue with the system after receiving a response without using the keyword. It relegates these systems to a form of communication that resembles amateur radio.

Additionally, natural language systems are capable of deciphering the meaning of a user query and provide a series of result descriptions correlating with the query. However, these systems do not offer a method for the user to then continue to use spoken input to select one of the results from the list and initiate the presentation of the content associated with a particular result description as well as traversing back to the list of result descriptions and interact with another result and its associated content, all by way of spoken input.

Accordingly, there is a need for a simple command system with a minimal number of commands or equivalent command-actions that allows the user to easily interact and control the system in a sustained, interactive manner as well as navigate dynamic, unknown content.

SUMMARY

A simple affirmative response operating system (OS) is disclosed, designed to enable a user to interact with a computer system in a screen-free manner by engaging in a sustained and immersive interaction between user and system, initiated by the user using a minimum number of commands or equivalent command-actions.

The simple affirmative response OS allows the user to initiate a selection with a single, system-wide and context-independent affirmative response and can receive unlimited, undefined and/or defined information, rather than the user being limited to receiving a single answer. The OS may present a list or sequence of audio or visual items to a user, after each of which the system may output an optional response prompt (either a tone or a visual indicator), pause and wait for user input, and output an optional conclusion response (either a tone or a visual indicator).

The simple affirmative response OS solves the issue that prevents current natural language voice searches from being truly interactive for the user. Used in conjunction with a natural language system, the user can initially perform a search on the Internet by voice using a natural language query. Using the simple affirmative response OS, the search results are read aloud in the form of a list with a pause between each search result. The user can then select and listen to various webpages associated with each search result in a sustained and interactive manner.

In contrast with existing intelligent home systems, which typically use a predefined list of commands that a user must remember and simply wait for a valid input instead of dialoguing to clarify user intent), the simple affirmative response OS allows an intelligent home system to interact with the user, guiding them through various options and settings presented as a list with a pause between each item. Even if the user does not know what the options or settings are, the user is guided and empowered to make selections and invoke personal settings using a simple affirmative response.

The simple affirmative response OS can facilitate a tourist's self-guided tour of a city and allow the tourist to hear historical information for various places of interest. Presenting the information based on the GPS location of the tourist by way of audio, the user can interact and navigate the information, hands-free as it is presented by way of the simple affirmative response OS. Furthermore, a tourist can be provided with a list of eating establishments within their proximity and use the simple affirmative response system to obtain detailed information regarding the types of food, hours, etc. for a chosen eating establishment.

A system is disclosed, comprising a processor, a sensor coupled to the processor, an electronic sensory presentation device, and non-transitory memory. The memory stores instructions that, when executed by the processor, cause the processor to store an identification of a unique, system-wide, and context-independent affirmative action; divide a content input to generate a sequence of contents and a sequence of identifiers, wherein each identifier of the sequence of identifiers is associated with a content from the sequence of contents; enter a list-pause cycle (comprising outputting, via the sensory presentation device, an identifier from the sequence of identifiers and pausing a predetermined length of time); repeat list-pause cycles until determining, via input from the sensor, that the affirmative action has been performed during the pause of a list-pause cycle; and responsive to determining that the affirmative action has been performed during the pause of the list-pause cycle, output, via the sensory presentation device, the content from the sequence of contents associated with the identifier output during that list-pause cycle.

A computer-implemented method for interaction between a human and a computing device, comprising storing an identification of a unique, system-wide, and context-independent affirmative action; dividing a content input to generate a sequence of contents and a sequence of identifiers, wherein each identifier of the sequence of identifiers is associated with a content from the sequence of contents; entering a list-pause cycle (comprising outputting, in an audio form, an identifier of the sequence of identifier and pausing a predetermined length of time); repeating list-pause cycles until determining the affirmative action has been performed during the pause of a list-pause cycle; and responsive to determining the affirmative action has been performed during the pause of a list-pause cycle, outputting, in an audio form, the content from the sequence of contents associated with the identifier output during that list-pause cycle.

A method is disclosed, comprising storing, by a first computing device, an identification of a unique, system-wide, and context-independent affirmative action; storing, by the first computing device, a sequence of available commands for a second computing device and a sequence of identifiers, wherein each identifier of the sequence of identifiers is associated with a command from the sequence of available commands; entering a list-pause cycle (comprising outputting, in an audio form, an identifier of the sequence of identifiers and pausing a predetermined length of time); repeating list-pause cycles until determining the affirmative action has been performed during the pause of a list-pause cycle; and responsive to determining the affirmative action has been performed during the pause of a list-pause cycle, transmitting, to the second computing device, the command from the sequence of available commands associated with the identifier output during that list-pause cycle.

DETAILED DESCRIPTION

Figure 1:
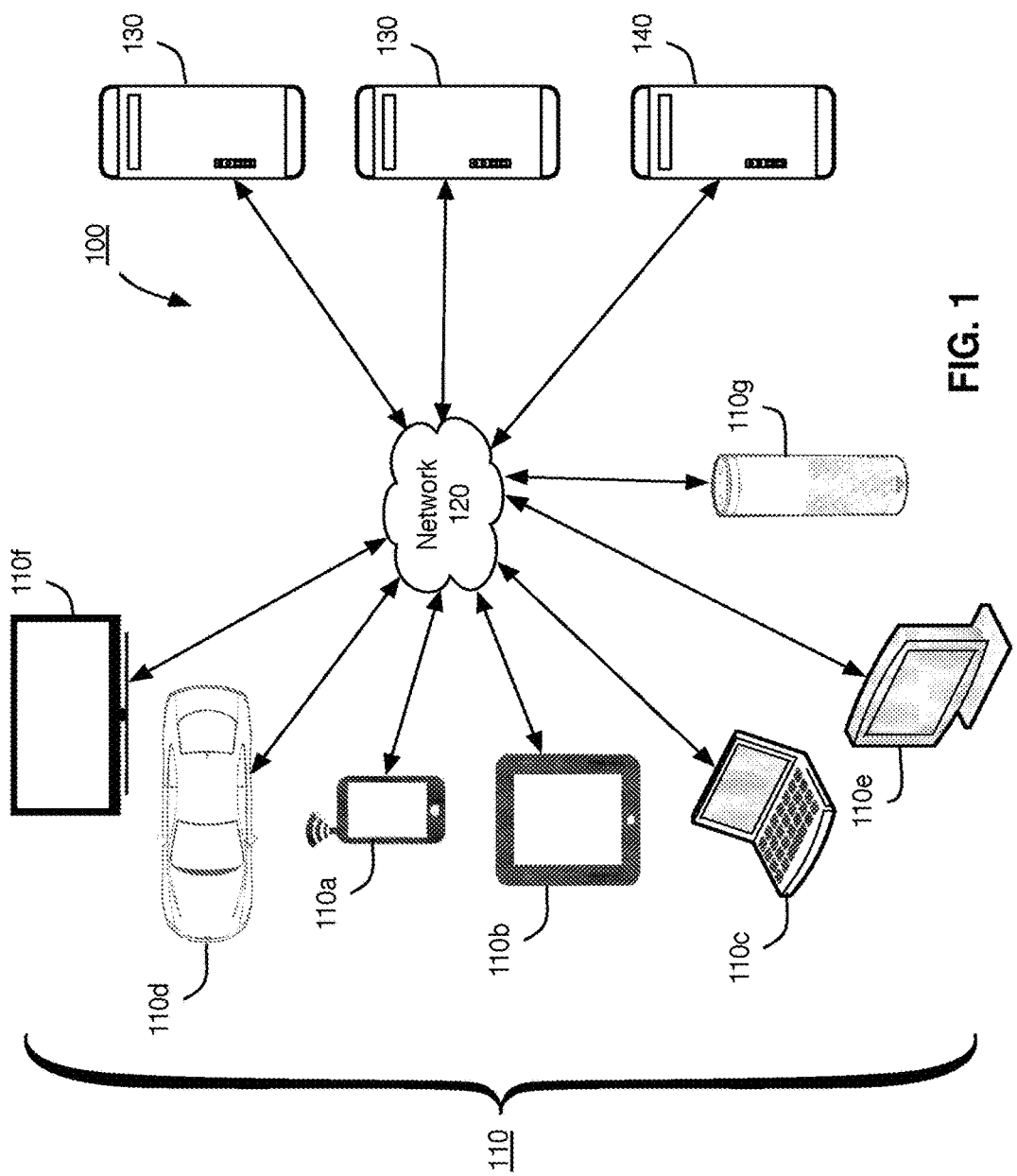
FIG. 1 is an illustrative network environment in which a simple response-driven operating system may be implemented.

The following detailed description refers to the accompanying drawings. The same labels and/or reference numbers in different drawings may identify the same or similar elements. The invention can be embodied in many different forms and should not be construed as limited to the embodiments set forth herein. Rather, the embodiments are provided so that this disclosure will be complete and will fully convey the invention to those skilled in the art.

This disclosure provides a technical solution to address the shortcomings of existing natural language systems (NLS) and other command-drive systems, since the embodiments described herein are not dependent on having an Internet connection, and allow a user to use and control, with a minimum number of voice commands or other responses, a dynamic application. The dynamic application may include, but is not limited to, an application for displaying elements from a playlist of unknown content.

For illustrative purposes, embodiments of the invention are described in connection with two primary methods. The first is a mechanism for interacting with information stored in a database, playlist, or other data storage, such as (but not limited to) email, text messages, news feeds, music and other media content, search results, smart homes, cars, and artificial intelligence (AI) systems. The second is a mechanism for more generally initializing or completely controlling an application via as few as three responses or actions. It is understood, however, the invention is not intended to be limited to the specific, illustrative embodiments described herein and is applicable to a variety of interactive applications and automated systems.

Embodiments of this disclosure are particularly well-suited for allowing a user of a computing device to use a minimum number of responses to navigate and control a list stored in a database or other data storage, especially where the list is dynamic and, therefore, not readily known to the user of the device.

Various specific details are set forth herein and in the drawings, to aid in understanding the invention. However, such specific details are intended to be illustrative, and are not intended to restrict in any way the scope of the invention as claimed herein. In addition, the particular screen layouts, appearance, and terminology as depicted and described herein are intended to be illustrative and exemplary and in no way limit the scope of the invention as claimed.

FIG. 1 illustrates a representative network environment 100 in which embodiments may be implemented. As shown in FIG. 1, a user employing a computing device 110 communicates over network 120. Network 120 may be a wide area network (WAN) such as the Internet, the Public Switched Telephone Network (PSTN), a local area network (LAN), an intranet, an extranet, a cellular network, any wired or wireless network, or any combination of the above.

The computing device(s) 110 are preferably mobile computing devices, such as (but not limited to) a smart phone 110a, tablet computer 110b, laptop computer 110c, in-vehicle computing devices 110d, or similar portable computing device, such as a smart television remote control, portable video game console, portable digital assistant, intelligent personal assistant, or wearable device (including, for example, a smart watch, bracelet, or eyeglasses). It is understood, however, that the invention disclosed herein is not limited to mobile computing devices and is applicable to other computing devices where it is desirable to interact with and control applications using voice or other commands.

For example, a visually impaired person utilizing a desktop computer 110e may want to hear a list of content or data and select desired content from the list using a voice command. Similarly, a person using an interactive television (iTV) or a cable television set-top box 110f may want to select a desired television program or movie from a list (e.g., listing of available programming on an interactive program guide) using a simple voice command. Other examples of non-mobile computing devices compatible with the disclosed method include intelligent personal assistant 110g, such as the Amazon® Echo® voice-activated speaker or Google® Home® voice-activated speaker.

For illustration purposes only, six representative computing devices 110 are shown in FIG. 1—a smart phone 110a, such as (but not limited to) an iPhone® or Android® handheld device; a tablet 110b, such as (but not limited to) an iPad® or Windows® Surface® tablet computer or a tablet computer running the Android® operating system; a laptop computer 110c; a desktop computer 110e, an iTV 110f, and an in-vehicle computing device 110d, such as (but not limited to) dedicated computing devices within a vehicle. Although six representative computing devices 110a-110g are shown in FIG. 1, it is understood that environment 100 may include any number of computing devices, each controlled by a respective user. For purposes of this disclosure, the term "computing device 110" will refer collectively to each of the devices 110a-110g, as well as to any other computing device capable of receiving any form of user input, as described below.

The computing devices 110, in a preferred embodiment, communicate with one or more third-party servers 130 over network 120. Data or other content may be downloaded or streamed from one or more respective servers 130 for storage in memory on computing device 110. Third-party servers 130 may include (but are not limited to) servers hosting a website, search engines, mapping services, email servers, news publisher servers for providing news feeds (e.g., Atom or RSS (Really Simple Syndication) feeds), or any other server from which desired content may be downloaded by or streamed to computing device 110 over network 120. The computing device 110 communicates with the third-party servers 130 to download content or commands, but does not require communication with the third-party servers over network 120 for ASR processing or processing of other forms of user input. Although only two third-party servers 130 are shown in FIG. 1, it is understood that environment 100 may include any number of third-party servers 130.

An optional intermediary system server 140 is also illustrated in FIG. 1 that, among other things, processes the desired content or data before it is downloaded by or streamed to computing device 110 from third-party servers 130 over network 120. This ensures that only the desired content or data is downloaded by or streamed to computing device 110. In some embodiments, the intermediary system server 140 strips out unwanted information that may be included with the desired content or data to be downloaded by or streamed to the computing device 110. For example, if desired content from a webpage hosted on third-party server 130 is to be downloaded by computing device 110, that webpage may include additional content (e.g., advertisements, images, navigation links, other unimportant content, etc.). Intermediary system server 140 may use conventional extractor software or programming to strip out this additional or unnecessary content so only the desired content (e.g., actual article/page text with no additional or unnecessary content) is downloaded for storage in the computing device 110.

In addition, in some embodiments, the intermediary server 140 may serve as a source of content to be downloaded by or streamed to computing device 110 over network 120, as opposed to or in addition to obtaining content or data from third-party servers 130. The intermediary server 140 may also be the source of available voice commands for client application software running on computing device 110. It is understood that intermediary server 140 may be separate from or combined with third-party server 130, and that one or more intermediary servers 140 may optionally be utilized with the various embodiments of this disclosure. Again, it is understood that ASR processing or other processing of input commands (such as gestures, movements, or other input detected by a sensor) can be performed locally on computing device 110 without the need to communicate over network 120 with third-party servers 130 or intermediary servers 140 for ASR processing or other processing of input commands. Nothing in this disclosure, however, should be construed to preclude the computing device 110 from being connected to network 120 for any purposes (e.g., connected to a cellular network for making calls, another application software running on computing device 110 communicating over a network for purposes other than described herein, etc.).

Figure 2:
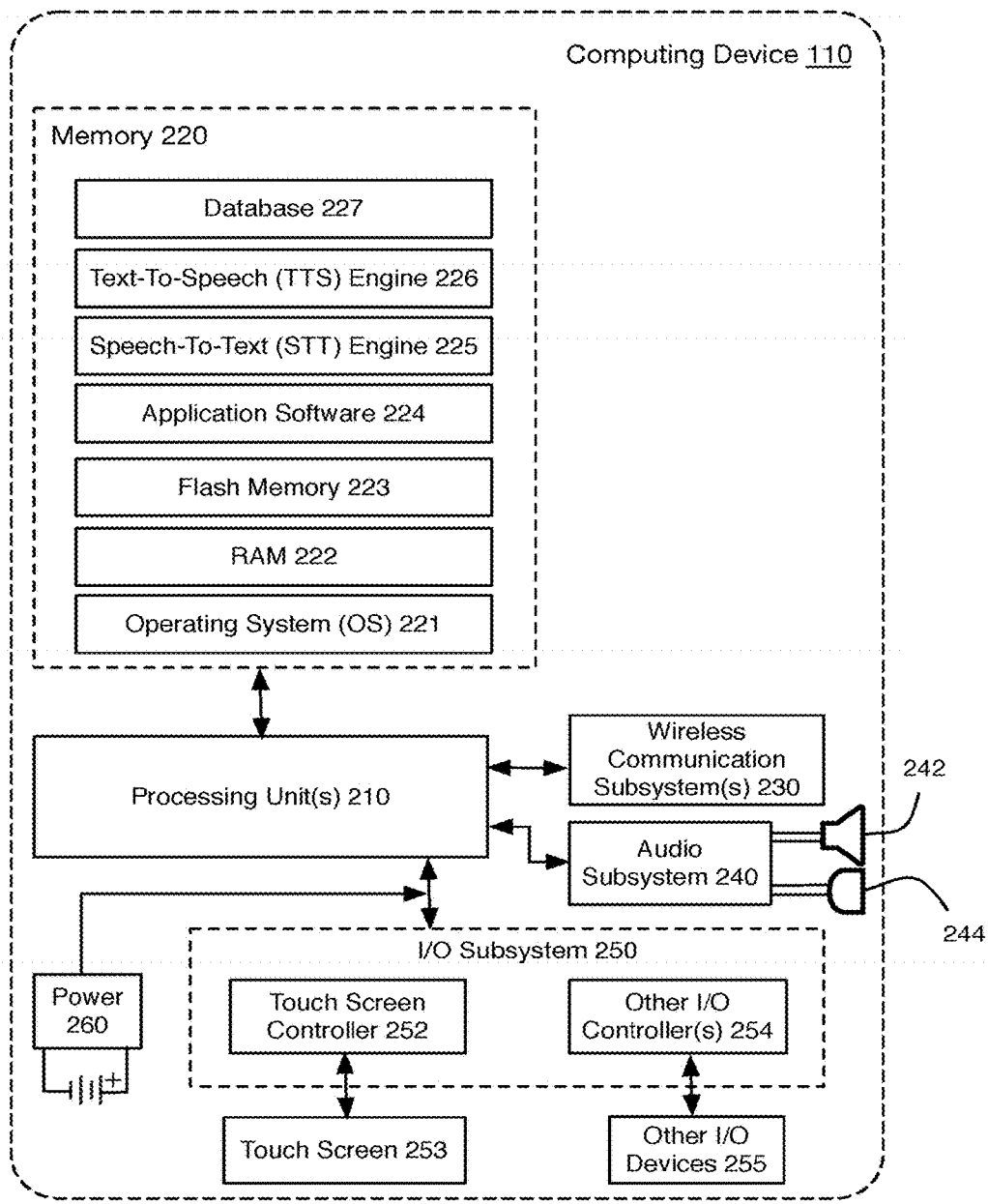
FIG. 2 is a block diagram of an illustrative computing device that may be utilized to implement the various features and processes described herein.

FIG. 2 is a block diagram of an illustrative computing device 110. As discussed above, examples of computing devices 110 include (but are not limited to) mobile computing devices, such as, for example, smart phones, tablet computers, personal digital assistants (PDAs), laptop computers, wearable devices, portable game consoles, or any other portable computing devices. While a representative mobile computing device 110 is illustrated in FIG. 2, it is understood that the invention disclosed herein is not limited to mobile computing devices and is applicable to other computing devices where it is desirable to interact with and control applications (including, e.g., web browsers, email clients, file managers, etc.), display media content, or display or review data by way of voice commands or other forms of user input.

As shown, computing device 110 includes one or more processing units 210 coupled to system memory 220, and various sensors and subsystems including (but not limited to) wireless communication subsystem(s) 230, audio subsystem 240, I/O subsystem 250, and power subsystem 260.

Wireless communication subsystem 230 facilitates wireless device communication functions over network 120. For example, wireless communication subsystem 230 may include one or more transmitters and receivers (not shown), which are implemented to operate over network 120.

Audio subsystem 240 is coupled to speaker(s) 242 to output audio and to microphone(s) 244 to facilitate voice-enabled functions, such as voice recognition, digital recording, telephony, etc.

I/O subsystem 250 facilitates the transfer between I/O peripheral devices, such as (but not limited to) a touch screen 253 and other I/O devices 255, and the data bus of the processing unit(s) 200. I/O subsystem 250 may include a touch screen controller 252 and other I/O controller(s) 254 to facilitate the transfer between I/O peripheral devices and the data bus of processing unit(s) 210.

Other I/O devices 255 may include, in some embodiments, a camera, a photodetector, a motion sensor, a pressure sensitive button or pad, a motion-sensitive trackpad, a manipulable joystick or other raised switch having one or more possible degrees of motion, an accelerometer, or a gradiometer. Other I/O devices 255 may, rather than being directly incorporated into computing device 110, be peripheral devices that connect to other I/O controllers 254 via a wired connection to a physical data port or via a wireless connection that is received by wireless communications subsystem 230. For example, other I/O devices may include a wireless mouse, wireless keyboard, wearable device (e.g., a smartwatch or bracelet having buttons, touchscreens, or accelerometers for user input), or a companion mobile computing device (e.g., a remote control for a television, or a mobile phone connected to a desktop computer).

The processing unit(s) 210 is coupled to system memory 220, which stores various software components or applications 224 to be executed by processing unit(s) 210. Preferably, memory 220 stores an operating system (OS) 221, which includes various procedures, sets of instructions, software components and/or drivers for controlling and managing general system tasks (e.g., memory management, storage device control, power management, etc.) and facilitates communication between various hardware and software components. System memory 220 also preferably includes RAM 222 and non-volatile flash memory 223, a combination of volatile/non-volatile memory, and/or any other type of memory.

System memory may include a speech-to-text (STT) engine 225, which receives speech input from the user of computing device 110 via microphone 244 and audio subsystem 240. In some embodiments, the STT engine 225 uses various acoustic and language models to recognize the speech input as a sequence of phonemes, and ultimately, a sequence of words or tokens written in one or more languages. The STT engine 225 can be implemented using any suitable speech recognition techniques, acoustic models, and language models, such as (but not limited to) Hidden Markov Models, Dynamic Time Warping (DTW)-based speech recognition, and other statistical and/or analytical techniques.

System memory may also include a text-to-speech (TTS) engine 226, which converts data in the form of text to a synthesized speech output via speaker 242 and audio subsystem 240. In some implementations, the synthesized speech can be created by concatenating phonemes of recorded speech that are stored in a voice database.

System memory 220 may also include at least one database 227. As will be discussed below with respect to FIG. 3, database 227 functions to store desired content and associated data in memory 220 on computing device 110. Database 227 is preferably a Structured Query Language (SQL) database, but can be structured as any other form of database, including, for example, a non-relational (NOSQL) database; a structured plaintext datafile, such as file storing comma separated value (CSV), JavaScript object notation (JSON), or extensible markup language (XML); an Excel®, Access®, or other desktop productivity suite filetype; or any other data storage format.

System memory 220 also includes communication instructions to facilitate communicating with one or more additional devices; graphical user interface (GUI) instructions to facilitate GUI processing; image processing instructions to facilitate image-related processing and functions; input processing instructions to facilitate input-related (e.g., manual input) processes and functions; audio processing instructions to facilitate audio-related processes and functions; and camera instructions to facilitate camera-related processes and functions. It is understood that the communication instructions described above are merely exemplary and the system memory 220 may also include additional instructions. For example, memory 220 for a smartphone 110 may include phone instructions to facilitate phone-related processes and functions. It is also understood that the above-mentioned instructions need not be implemented as separate software programs or modules.

While the components illustrated in FIG. 2 are shown as separate components, one of ordinary skill in the art will recognize that two or more components or modules may be integrated into a single component or module. In addition, two or more components may be coupled together by one or more communication buses or signal lines. Also, while many of the functions have been described as being performed by one component or module, one of ordinary skill in the art will realize that the functions described with respect to FIG. 2 may be split into two or more components or modules.

The computing device 110 also includes one or more power source(s) 280 for powering the various hardware components of the computing device. Power source 280 may include a power management system, one or more power sources, a recharging system, a power failure detection circuit, a power converter or inverter, a power status indicator, and any other components typically associated with the generation, management and distribution of power in computing devices.

Figure 3:
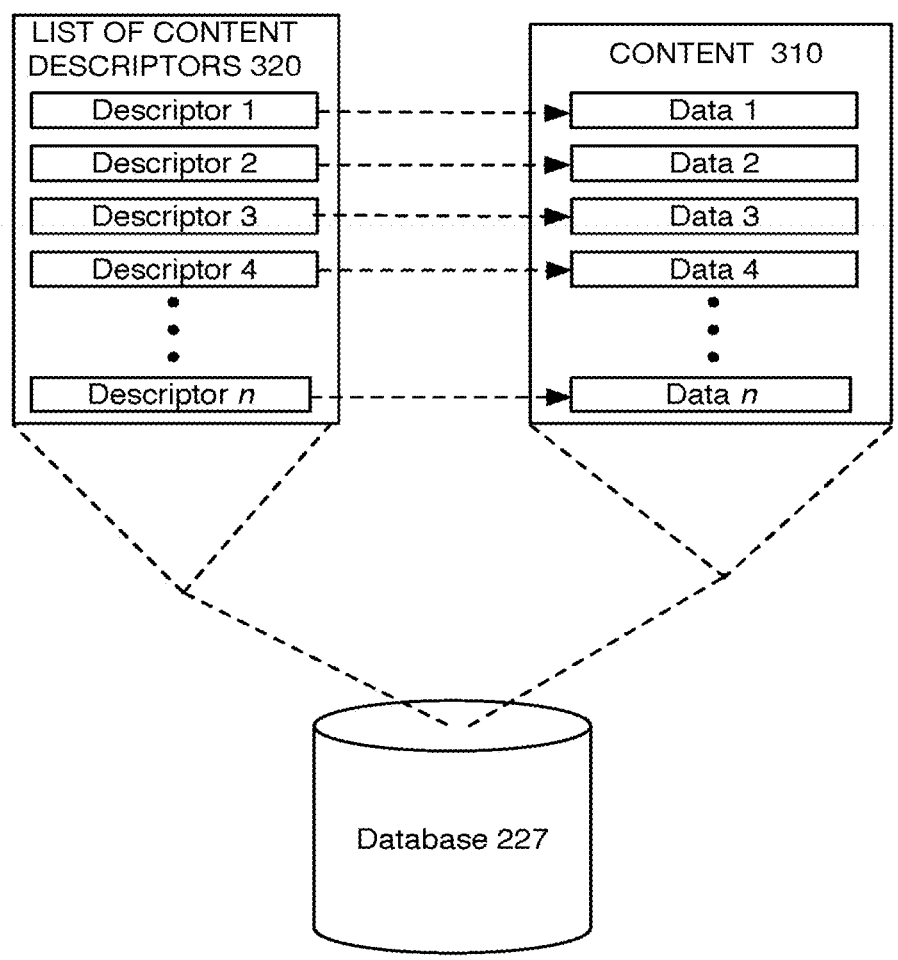
FIG. 3 is an illustrative diagram of representative descriptors and content stored in a database on a computing device.

FIG. 3 illustrates a high level representation of content and descriptors of content stored in a database 227 on a computing device 110. Content 310 refers to desired content or data items (Data 1, Data 2, Data 3, Data 4, . . . Data n) stored in memory 220 of computing device 110.

In some implementations, the desired content is downloaded by or streamed to computing device 110 over network 120 for storage in memory 220. For example, the desired content may be (but is not limited to) full text news articles obtained from third-party servers 130 (and optionally stripped of unwanted or unnecessary information by an extraction process performed by intermediate system server 140). In other implementations, the desired content may be generated by, or entered into, another application running on computing device 110.

Any form of sequential content or content that can be converted or divided up into a sequential form may be presented using the presently disclosed system. Other examples of desired content or data items include (but are not limited to) the text associated with webpages identified by an Internet search engine, search with in private data repositories such as Lexis-Nexis®, emails from an email server or system, books presented in a digital format that are presented as text or audio, text messages received by a mobile phone or messaging system, instant messages received from a messaging protocol, events/appointments in a calendar system, information about physical locations identified by mapping software or search engines, audio files (e.g., episodes of a podcast, songs from an internet radio service or other audio streaming service, or subparts of an HTTP Live Streaming playlist), video files (including, e.g., episodic video content from a video hosting service or video streaming service), updates or status indications from a user's contacts on a social networking site, new threads or posts in an interactive forum, contents of recipes in electronic cookbooks or other databases, new articles in an online newspaper, online magazine, or blog, updates or actual events recorded in an available data source (e.g., a police scanner/blotter, a list of real estate available from a realtor, classified advertisements from a newspaper, a list of newly introduced legislation in a legislature, etc.), or information gathering by way of an interactive questionnaire used for research (e.g., medical, marketing, or political surveys).

In an alternative embodiment, rather than the display of textual or other media content for a user's consumption, the stored elements may be user interface items intended for a user to interact with. For example, memory 220 may store information regarding graphical user interface (GUI) buttons, toggles, radio buttons, drop down boxes, hyperlinks, tabs, windows, dialog boxes, error messages, or collapsible sections of content. Memory 220 may also store a list of other applications currently running in memory, and any application programming interface (API) or other elements that are capable of manipulating, controlling, inputting data into, or getting data from these other applications. Consequently, in contrast to the primary embodiment of outputting content described in the following paragraphs, a command system may be used to interact with other applications as an additional mode of input to any identified GUI or API elements of those applications. An API may in turn be provided by the disclosed method in order to allow other software to control aspects of data output, recognition of user input, or the method by which a user's selection of input is determined.

An illustrative high level list of content descriptors 320 is also stored in database 227 of computing device 110. The list of content descriptors 320 includes Descriptor 1, Descriptor 2, Descriptor 3, Descriptor 4, . . . Descriptor n. Each descriptor in the list of content descriptors 320 is preferably a text-based summary or description of an associated content or data listed in content 310. For example, Descriptor 1 is a text-based summary or description of Data 1, Descriptor 2 is a text-based summary or description of Data 2, and so on. The descriptor may be, for example, a text-based headline for a news article, text appearing in the subject of an email or text message, a text-based summary of a webpage identified in the results of an Internet search, etc.

In some implementations, the descriptor in the list of content descriptors 320 may be downloaded by or streamed to the computing device 110 over network 120.

By way of example only, in the context of news feeds, a user of computing device 110 could subscribe to one or more RSS feeds published by third-party news server(s) 130. The RSS feed may include text-based headlines and URLs for the actual news article associated with each headline. One or more headlines included in the RSS feed can be stored in memory 220 of computing device 110 for inclusion in the list of content descriptors 320 of database 227. An application software 224 running on computing device 110 causes the processing unit(s) 210 to send a request over network 120 to the third-party server 130 to obtain the full text of the actual news article corresponding to the URL included in the RSS feed. Once received (optionally after extracting unwanted or unnecessary content from the retrieved news article using intermediate system server 140), the full text of the news article can be stored in memory 220 of computing device 110 for inclusion in the list of content 310 of database 227.

In a second example embodiment, in the context of emails, a user of computing device 110 could have one or more email accounts on one or more email servers 130. Via any email protocol, including for example IMAP, POP, or Microsoft Exchange®, the computing device may access the email headers and contents of one or more stored emails on email servers 130, and the headers and/or contents may be stored in memory 220 of computing device 110 for inclusion in the list of content descriptors 320 of database 227.

In a third example embodiment, in the context of search engine queries, a user of computing device 110 could cause a search query to be transmitted (via the hypertext transfer protocol (HTTP) or any other protocol) to one or more search engines hosted by one or more web servers 130. Search results containing a series of URLs of webpages responding to the query, and/or contents or titles of the webpages themselves, may be stored in memory 220 of computing device 110 for inclusion in the list of content descriptors 320 of database 227.

In a fourth example embodiment, in the context of location-aware searching, a user of computing device 110 could cause a current location of the user or the user's device (as determined by a street address or GPS sensor) to be transmitted to search engines hosted by one or more web servers 130. Search results containing a series of locations, identifiers of those locations, and/or pertinent information about the history of those locations or services provided at those locations may be stored in memory 220 of computing device 110 for inclusion in the list of content descriptors 320 of database 227.

In a fifth example embodiment, in the context of video streaming, a user of computing device 110 could cause the computing device to transmit a request for available videos to a video streaming service (e.g., YouTube®, Hulu®, Netflix®, HBO Go®, etc.). The request could comprise additional information, such as an identification of the user, subscription information about the user, or a query for a particular brand or source of content, in order to narrow down which videos are available. In response, the computing device receives a series of video titles (and/or other information such as publisher, video length, episode or season numbers) and identifiers allowing a video to be played, which may be stored in memory 220 of computing device 110 for inclusion in the list of content descriptors 320 of database 227. In addition, the user of the computing device can receive a stream of shortened video clips in a successive order and make a selection without storing any data locally on the device.

In a sixth example embodiment, in the context of home appliances, a user of computing device 110 could cause the computing device to transmit a request for available settings or commands to a smart home appliance such as a thermostat or coffee maker. In response, the computing device receives a list of possible settings to change (and the values to which the setting may be changed) and/or a list of possible commands to the device (including, for example, "turn off" or "begin brewing"), which may be stored in memory 220 of computing device 110 for inclusion in the list of content descriptors 320 of database 227.

In a seventh example embodiment, in the context of smart vehicles, a driver or manufacturer of smart vehicle 110 could cause the vehicle to be pre-loaded with a series of settings or commands (including, for example, turning on a radio, requesting a current value such as fuel level or oil level, or determining other vehicle statuses) in a list of content descriptors 320 stored in database 227.

GO (Or Equivalent Simple Affirmative) Response

User navigation of the application software 224 executed by processing unit(s) 210 on computing device 110 is designed so the device user need only know a limited or minimal number of simple, easily remembered responses ("simple responses"). In a preferred embodiment, the simple responses are voice responses, each consisting of a single spoken word or phrase.

In an alternative embodiment, responses may be provided by a user without speaking, including, by way of non-limiting example, manipulation of an input device (e.g., a keyboard, mouse, button, joystick, trackpad, etc.), a hand gesture (e.g. a hand wave, a shaking of a mobile device, a movement of the hand from one elevation to another, or a gesture having a meaning in a sign language), a movement or positioning of fingers (e.g., a "thumbs up", an open palm, a closed fist, a particular number of fingers pointing away from the hand, a particular finger or fingers pointing away from the hand, etc.), a facial movement (e.g., a wink, a blink, a number of blinks, a movement of the eyes in a particular direction, a raised eyebrow, a smile, a frown, etc.), other muscle movements (e.g., a tap of a finger or foot on a surface, a muscle twitch in an otherwise paralyzed or amputated limb), non-verbal sound inputs (e.g., clapping hands or a series of claps, humming, coughs, clicks, utterances, etc.), or even input from an electroencephalograph or other device that directly measures brain activity of a user. A response may consist of a combination of two or more such response types, such as speaking a word while holding down a button.

In some embodiments, the application software 224 can be configured to respond to only three responses, such as a simple affirmative response, a simple pause-initiation response, and a simple options-initiation response. Consequently, a user of computing device 110 need only remember the three simple responses. The responses are ideally unique responses both system-wide and independent of context. For example, the same set of three responses should be used in every menu of an application, or in every task that might be performed by a productivity software suite, or for the display of every type of media content, or for navigating a variety of different websites, or for reviewing results of different query types or search engines, or for the control of every physical component controlled by a controller using an affirmative response interface, or for every application controlled by an operating system, or for both a normal mode and a navigation or help mode of an application. As a result, a user need not learn a different set of responses based on media type (such as "read" for text or "play" for video) or for navigation (such as "back/forward" in a web browser or "parent/child" for a file explorer with hierarchical nodes).

For example, the simple affirmative response could be a verbal response selected from any one of "GO", "YES", "SELECT", "CHOOSE", a similar statement of assent to continuing, or the equivalent of one of these response, localized to a different language ("ALLEZ", "OUT", "SI", "DA", etc.). The simple pause-initiation response could be, for example, any one of "STOP", "NO", "CEASE", "WAIT", a similar statement indicating that continuing is not desired, or the equivalent of one of these response, localized to a different language ("ARRET", "ALTO", etc.). The simple options-initiation response could be, for example, any one of "HELP", "WHAT", "MENU", "OPTIONS", another response indicating an intent that is neither continuing or stopping, or the equivalent of one of these response, localized to a different language ("AIDE-MOI", "AYUDA", etc.).

In a non-verbal embodiment, the three simple response could be, by way of example only, a thumbs up, thumbs down, and an open palm; or one blink, two blinks, and a wink; or clicks of different buttons on a mouse or other peripheral device having at least three buttons; or a single-click, double-click, and triple-click of a mouse or other button; or different numbers of taps against a surface with a foot or finger; or any three ways of interacting with an input device capable of distinguishing three separate examples of input.

In some embodiments, more than three responses may also be available to the user to enable faster interaction with navigation the software application 224.

The simple affirmative response GO (or equivalent simple affirmative response) is preferably the default response to initiate different actions at different states within the application software 224 running on computing device 110. For example, when a user inputs a GO response (or equivalent simple affirmative response) during a pause between the TTS output of a list, the application software 224 may cause the processing unit(s) 210 to initiate a default action specific to that mode or sequence. Representative examples of default action by the processing unit(s) 210 may include (but are not limited to):

- A GO response input may initiate the output of a content associated with an identifier of that content that immediately preceded the GO response input.
- At the end of a mode or sequence where a list of available options for how to proceed are output to the user, a GO response initiates the action associated with the item in the list that immediately preceded the GO response input.
- When presented with a list of Settings, a GO response input may select the setting (e.g., changing the speed of the output) that immediately preceded the GO response input.

The STOP response (or equivalent simple pause-initiation response) input allows the user of computing device 110 to interrupt action within the application software 224 and enter into an Indefinite-Length Pause ("Wait Pause") as will be described below. For example, a user of computing device 110 could input a STOP response during the pause(s) in output of a list, which would cause processing unit(s) 210 to interrupt the output and remain indefinitely in a paused state until the user provides another response input.

The HELP response (or equivalent simple options-initiation response) input allows the user of computing device 110 to obtain a list of voice or other input responses that are available to the user within the software application 224. Upon receipt of a HELP response input, the application software 224 causes processing unit(s) 210 to output a list of available responses through speaker(s) 242 or other electronic sensory presentation device. Optionally, after the user received the desired response, the user simply provides a GO response (or equivalent simple affirmative response) input to cause the processing unit(s) 210 to invoke the desired response within software application 224.

Pauses

Pauses introduced in the navigation of application software 224 provide the user with the time needed to input a response. Because a pause results in the absence of sound and occurs naturally during presentation of speech, the pause may be preceded by a short tone or other media or sensory output to alert the user to the imminent pause. In addition, the pause may also be followed by a short tone (or other media or sensory output) to habituate the user to a predefined length of time (t) of the pause and remove any sense of randomness to the length of the pause.

In some embodiments, there may be two types of pauses—a List-With-A-Defined-Length Pause ("List Pause") and an Indefinite-Length Pause ("Wait Pause")—to facilitate user interaction with the application software 224 executed by processing unit(s) 210 on computing device 110. The List Pause is preferably set for a short, predefined length of time (t) (e.g., 1.5 seconds—4 seconds) and used predominantly throughout the presentation of labels in the application software 224. The Wait Pause often occurs at the end of a List Pause or after the user inputs a STOP response during a List Pause.

The List Pause may be a different length for different applications, purposes, or content types; for example, when presenting streaming content such as a video, audio book, or podcast, the List Pause may be much shorter, to allow a return to the content with minimal interruption, and when presenting text or other information typically meant for consumption at the user's chosen pace, a longer List Pause may be used.

The Wait Pause facilitates changing to a different mode in the computer system in addition to pausing indefinitely. Once a Wait Pause is invoked, the user can continue with the current mode with the Go command/command-action or use other commands to change to, for example, Settings or Selecting a Different Channel or passing user control to a Natural Language interface.

List Pause

In some embodiments, the application software 224 executed by processing unit(s) 210 on computing device 110 may provide two or more types of lists to the user. The first list type may be the Content List 310 or List of Content Descriptors 320 (e.g., short content, such as (but not limited to) headlines, names of songs, etc.; and/or longer content divided into segments (e.g., one or more paragraphs) separated with a pause, such as (but not limited to) summaries, stories, articles, etc.). The second list type may be a Navigational List that presents options to the user to navigate throughout the application software 224.

With the Content List, List of Content Descriptors or Navigational List, the application software 224 preferably causes the processing unit(s) 210 to initiate the output of each item in the list followed by a short List Pause for a predefined length of time (t) to allow sufficient time for the user of computing device 110 to interact with the list (or a story/article divided into segments) and control movement within the list or content. The predefined pause time (t) may be a fixed time (e.g., about 2.5 seconds) programmed in the application software 224, or it can be a specific time (t) selected by the user of computing device 110 from a range of available pause times (e.g., from about 1.5 seconds to about 4 seconds). In addition to the GO response (or equivalent simple affirmative response), other simple responses that may also be available for the user to interact and control the list or content may include (but are not limited to) RESTART, REPEAT, GO-BACK, SKIP, NEXT and/or PREVIOUS, as well as SAVE and/or DELETE.

In addition, the short List Pause facilitates the user to input a simple affirmative response to initiate a default action specific to that mode or sequence by the application software 224, such as (but not limited to) select and output of the associated content (story, article, etc.), or to initiate the action associated with an item in a Navigational List, such as, by way of example only:

"When you hear your selection, say GO"
 [1] "Choose another Channel within the current Topic"
  [Tone, List Pause, Tone]
 [2] "Go back to the list of Topics"
  [Tone, List Pause, Tone]
 [3] "Exit and go back to where you were"
  [Tone, List Pause, Tone]

With respect to output of longer content, it is preferred to divide longer content into segments (e.g., paragraphs or groups of paragraphs) and insert a List Pause between the output of each segment. The List Pause between output of segments of longer content facilitates the following non-limiting conveniences for the user of computing device 110 because the device may have impaired ability to listen or receive other input due to command-feedback when in speaker mode and thus the user may not be able to effectively interrupt the output using a command. Introducing a List Pause improves the overall experience for TTS output of longer content by providing control over the longer content during speakerphone playback. This contrasts with other forms of audio broadcast (e.g., radio) and other audio recordings.

Wait Pause

When a user of computing device 110 encounters a Wait Pause, the application software 224 has paused indefinitely and preferably remains in the paused state until the user provides a response input or passes control to a natural language interface. If the user passes control to a natural language interface, the List Pause and Wait Pause cycles may be terminated until the natural language interface is used to request content that can be converted into a sequential form amenable to navigation and output using simple affirmative responses.

In some embodiments, this can occur at the end of output of a Navigational List with the user not initiating changing to a different mode and the application software 224 remaining in wait state. When the user inputs a simple affirmative response during the Wait Pause, the application software 224 may provide the user with instructions as to how to proceed, such as, by way of example only:

"You are in Extended Help with Responses for Channel Mode while the news reader application software is Paused"

"After you hear your selection and the Listen Tone, say GO"

[1] "Exit Extended Help and return to Current Channel."
[Tone, List Pause, Tone]
[2] "Return to General Response Help."
[Tone, List Pause, Tone]
[3] "Read the list of available commands for Channel Mode."
[Tone, List Pause, Tone]
[4] "Restart Extended Command Help for Channel Mode"
[Tone, List Pause, Tone]

A Wait Pause may also occur when the user of computing device 110 inputs a simple pause-initiation command. The application software 224 causes the processing unit(s) 210 to then change to the Wait Pause, preferably preceded by a tone or other media or sensory output. The tone or other output preceding the Wait Pause is preferably a different output than the one preceding the List Pause to indicate to the user that they are in a different pause state.

The Wait Pause that occurs after the simple pause-initiation command enables the user to navigate to other modes within the application software 224 using additional responses, such as, for example, HEADLINES, STORIES, CHANNELS and SETTINGS. If the user is in a Wait Pause during the output of content (e.g., playback of a story or article), the user may input a simple affirmative response, which default action specific to that mode or sequence may be to continue the output of the paused content. In addition to the affirmative response, the user may use other List control simple responses, such as (but not limited to) RESTART, REPEAT, GO-BACK, SKIP, NEXT, PREVIOUS and/or HELP.

If a user attempts a predetermined number of times to perform an input action while in a Wait Pause and the system is unable to determine the user's intent (such as three failed input attempts by the user), the system may automatically switch into a guide or help mode and begin outputting possible commands that a user may have meant, or outputting all possible commands or navigation options to allow the user to reorient themselves.

A simple affirmative response following a Wait Pause may cause the processing unit(s) 210 to initiate the output of a list, such as (but not limited to) an entire list of headlines, with each item in the list separated by a List Pause; continue the output of a paused story (which may represent segments or paragraphs of content); or merely "awaken" the application software 224 from the indefinite-length Wait Pause to inform the user of their "location" in the application software, such as the sequence in which the user resides in the application software, and initiating the output to the user of available options, such as (but not limited to) to remain or change to a different mode within the application software.

Figure 4:
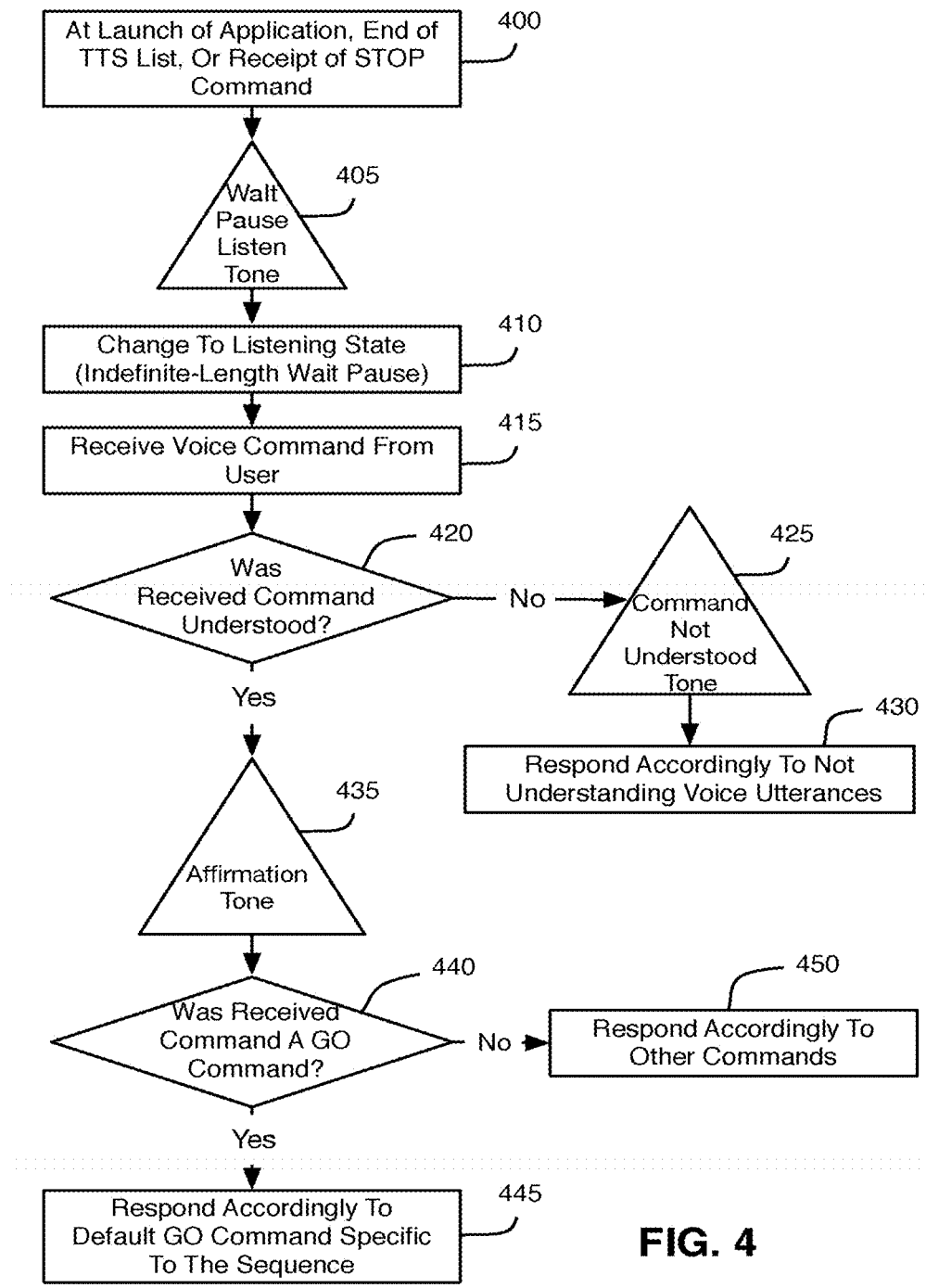
FIG. 4 is an illustrative flow diagram of an example implementation of a Wait Pause with the simple response-driven system.

FIG. 4 is an illustrative flow diagram of an example implementation of a Wait Pause (described above) with the simple affirmative response operating system. While not illustrated in FIG. 4, the process described below may be initiated, for example, in response to a response input by the user using microphone(s) 244 or other I/O device 255 of the computing device 110, or in response to some other action or event occurring while the application software 224 is running on computing device 110. For example, assuming that one of the following has occurred that will result in the application software 224 causing the processing unit(s) 210 to enter into a Wait Pause: the application software 224 has just been launched by the user on the computing device 110, the processing unit(s) 210 have completed output of a list (e.g., content descriptors, content, available responses, etc.) through speaker(s) 242 or other electronic sensory presentation device, or received a simple pause-initiation response input from the user via microphone(s) 244 or other I/O devices (Step 400). In response, the processing unit(s) 210 causes the output of a listen tone or other sensory feedback—a Wait Listen signal in this example—to the user through speaker(s) 242 of computing device 110 (Step 405).

The application software 224 causes the processing unit(s) 210 to change to a listening state to detect a response input by the user (Step 410). In the example illustrated in FIG. 4, the listening state 410 is an indefinite-length Wait Pause, where the application software 224 has paused indefinitely and preferably remains in the paused state until the user provides a response input or passes user control to a natural language interface. Wait Listen signal (Step 405) is preferably a distinctive signal, such as, for example, a double tone or the like, to indicate to the user of computing device 110 that the application software 224 is paused indefinitely and waiting for a response input from the user.

Once the user provides a response input via microphone(s) 244 or other I/O device 255 (Step 415), the STT engine 225 (or, if the response is non-verbal, a visual input or other signal processing unit) converts the received response input from for processing by processing unit(s) 210. If the received response input is not understood (Step 420), then the processing unit(s) 210 causes output of a Response Not Understood signal (Step 425). The Response Not Understood signal is preferably distinct from Wait Listen signal (Step 405) or other signals so that the user may recognize that the response was not understood by the system. The application software 224 then causes the processing unit(s) 210 to respond accordingly to not understanding a response input (Step 430). The response may be, for example, a TTS output indicating that the response input was not understood, or a TTS output of a list of responses available to the user at that location or sequence within application software 224 with a List Pause of a predefined time (t) between each item in the list to allow the user time to provide a GO voice response (or equivalent simple affirmative response) input after hearing the TTS output of the desired item in the list.

If the response is understood (Step 420), then the processing unit(s) 210 causes the audio subsystem 240 to output an Affirmation signal through speaker(s) 242 (Step 435). The Affirmation signal is preferably distinct from Wait Listen signal (Step 405), Response Not Understood signal (Step 425) and any other signal so that the user may recognize that the response was understood by the system. The processing unit(s) 210 determines whether the received simple response input was a GO (or equivalent affirmative) response (Step 440). If the processing unit(s) 210 determines that the received voice response was a GO (or equivalent affirmative) response, then the processing unit(s) 210 processes and responds accordingly to the received default GO response (Step 445). Alternatively, if the processing unit(s) 210 determines that a simple response other than a GO response (e.g., RESTART, RESTORE, CHANNELS, STORIES, SETTINGS, HELP, etc.) is received from the user (Step 440), then the processing unit(s) 210 processes the received other response and responds accordingly (Step 450).

Figure 5:
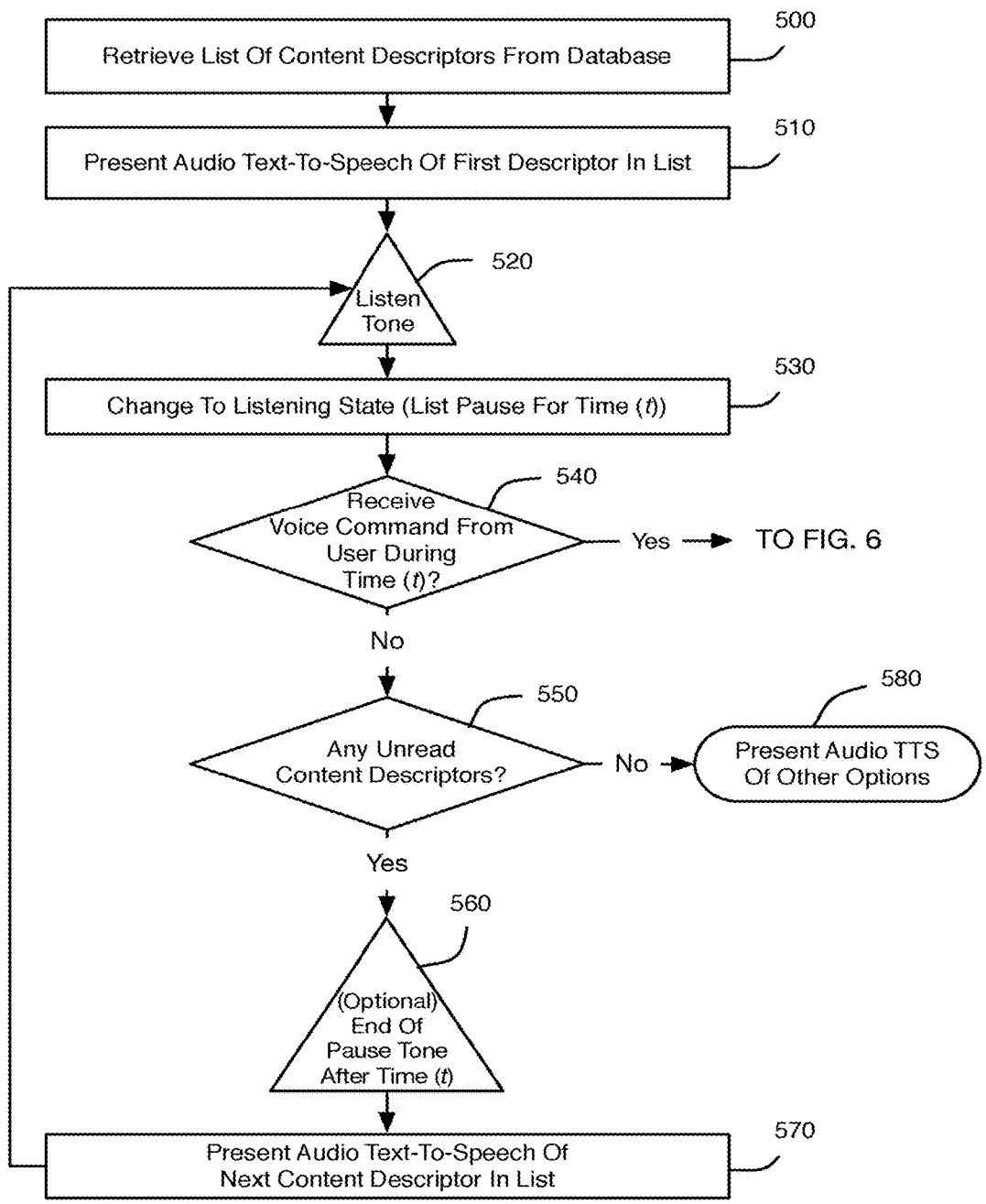
FIG. 5 is an illustrative flow diagram of an example implementation of a List Pause with the simple response-driven system.
Figure 6:
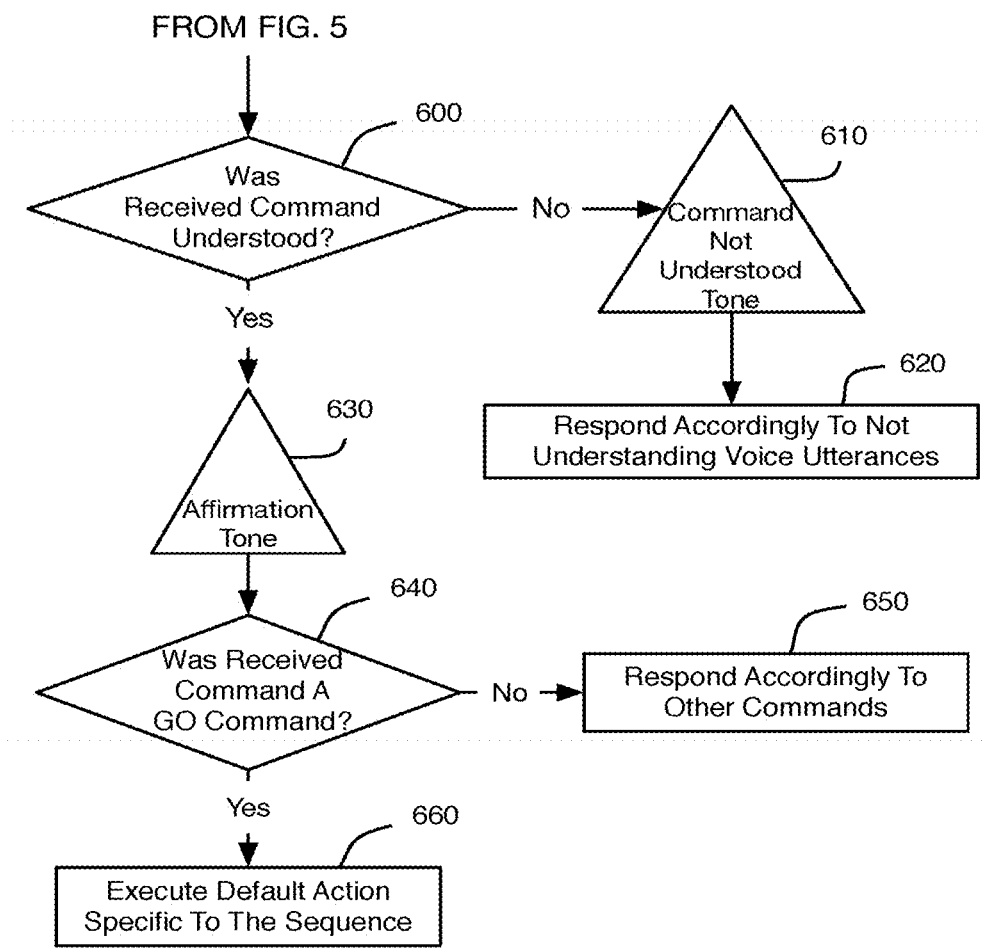
FIG. 6 is a continuation of the illustrative flow diagram of the example implementation of FIG. 5.

FIGS. 5 and 6 are an illustrative flow diagram of an example implementation of a List Pause (described above) with the simple affirmative response operating system.

While not illustrated in FIG. 5, the process described below may be initiated, for example, in response to a response input by the user using microphone(s) 244 or other I/O device 255 of the computing device 110, or in response to some other action or event occurring while the application software 224 is running on computing device 110.

The process described below may, in some embodiments, be initiated by an open ended natural language prompt (e.g., "What were the greatest achievements of George Washington?") that, when converted by a speech-to-text system and input to a search engine, yields an output suitable for sequential processing such as a list of search results. After a user has received one or more of the sequential results and is satisfied, the user may use the navigation system (via an options-initiation response or another command during a Wait Pause) to exit the simple affirmative response system and to return to a natural language input mode. In other embodiments, a system may use exclusively a simple affirmative response protocol for all input and output interactions.

In this example, the application software 224 causes the processing unit(s) 210 to retrieve the list of content descriptors 320 residing in database 227 (Step 500). Once retrieved, the processing unit(s) 210 may cause the TTS engine 226 and audio subsystem 240, or another electronic sensory presentation device (including, e.g., a screen or light-emitting diode for visual feedback, or a vibration device for tactile feedback) to provide output of a first content descriptor (e.g., Descriptor 1) in the list of content descriptors 320 to the user through speaker(s) 242 (Step 510). For purposes of this disclosure, the first content descriptor refers to text of the first content descriptor retrieved for TTS output from the list 320, but is not necessarily the first content descriptor in the list 320.

After output of the first content descriptor (e.g., Descriptor 1 of FIG. 3) retrieved from the list of content descriptors 320 is completed, the processing unit(s) 210 may cause the audio subsystem 240 or other electronic sensory presentation device to output a listen signal (Step 520) and change to a List Pause listening state for a predefined time (t) to detect a response input from the user (Step 530). The List Pause listen signal (Step 520) is preferably a distinct audible tone (e.g., a single tone or the like) from the Wait Pause Listen signal (Step 405), Response Not Understood signal (Step 425) and Affirmation signal (Step 435) described above with respect to FIG. 4, to indicate to the user of computing device 110 that the application software 244 is in a List Pause state that will time out after pause time (t) if the user does not provide a response.

If no response input is received during the predefined pause time (t) (Step 540), then the processing unit(s) 210 determines whether there remain any content descriptors (e.g., Descriptors 2, Descriptor 3, Descriptor 4, . . . Descriptor n) in the list of content descriptors 320 that have not been TTS output to the user through speaker(s) 242 (Step 550). If there are descriptors remaining that have not been TTS output to the user (Step 550), then the processing unit(s) 210 may optionally cause the audio subsystem 240 or other electronic sensory presentation device to output an end of pause signal (Step 560). The end of pause signal (Step 560) is preferably distinct from the List Pause listen signal, Wait Pause listen signal, Response Not Understood signal and Affirmation signal, so that the user of computing device 110 can differentiate between them.

If there are content descriptors remaining from the retrieved list 320 that have not been output to the user (Step 550) or after output of the optional end of pause signal (Step 560), the processing unit(s) 210 causes the conversion a next content descriptor in the retrieved list of content descriptors 320 for output to the user through audio subsystem 240 and speaker(s) 242 or other electronic sensory presentation device (Step 570). The process in Steps 520-570 is repeated until either a response input is received from the user through microphone(s) 244 or other I/O input device 255 (Step 540), or a predefined number or all of the descriptors (e.g., Descriptor 3, Descriptor 4, . . . Descriptor n of FIG. 3) in the retrieved list of content descriptors 320 have been output to the user through audio subsystem 240 and speaker(s) 242 or other electronic sensory presentation device. In the latter case, the processing unit(s) 210 may optionally cause the system to provide an output to the user through audio subsystem 240 and speaker(s) 242 or other electronic sensory presentation device as to other options from which the user may provide response input (Step 580). It is understood that the retrieval and output of the content descriptors within the list of content descriptors 320 can be sequentially, random or any order desired. The important aspect is the retrieval and output of descriptors in the list 320, not the order in which the descriptors are retrieved and output to the user.

Referring to FIG. 6, if a response input from the user is received during the pause time (t) (Step 540 in FIG. 5), then the processing unit(s) 210 causes the STT engine 225 or other processing unit to convert the input to a text response for processing by processing unit(s) 210. If the received response input is not understood (Step 600), then the processing unit(s) 210 causes the audio subsystem 240 or other electronic sensory presentation device to output a Response Not Understood signal (Step 610). The Response Not Understood signal is preferably distinct from List Pause listen signal, Wait Pause listen signal, Response Not Understood signal, Affirmation signal and optional End of Pause signal so that the user may recognize that the response was not understood by the system. The application software 224 then causes the processing unit(s) 210 to respond accordingly to not understanding a response input (Step 620). The response may be, for example, a TTS output indicating that the response input was not understood, or a TTS output of a list of responses available to the user at that location within application software 224.

If the converted response is understood (Step 600), then the processing unit(s) 210 causes the audio subsystem 240 or other electronic sensory presentation device to output an Affirmation signal through speaker(s) 242 (Step 630), which informs the user that the response input was understood by the system. The Affirmation signal is preferably distinct from List Pause listen signal, Wait Pause listen signal, Response Not Understood signal and optional End of Pause signal so that the user may recognize that the response was understood by the system.

The application software 224 causes the processing unit(s) 210 to determine whether the received response input was a GO response (or equivalent affirmative response) (Step 640). If the processing unit(s) 210 determines that a response other than a GO response (e.g., RESTART, RESTORE, CHANNELS, STORIES, SETTINGS, HELP, etc.) is received from the user (Step 640), then the processing unit(s) 210 processes the received other response and responds accordingly (Step 650). Alternatively, if the processing unit(s) 210 determines that the received response was a GO response (or equivalent affirmative response), then the application software 224 causes the processing unit(s) 210 to execute default action specific to that mode or sequence (Step 660).

Figure 7:
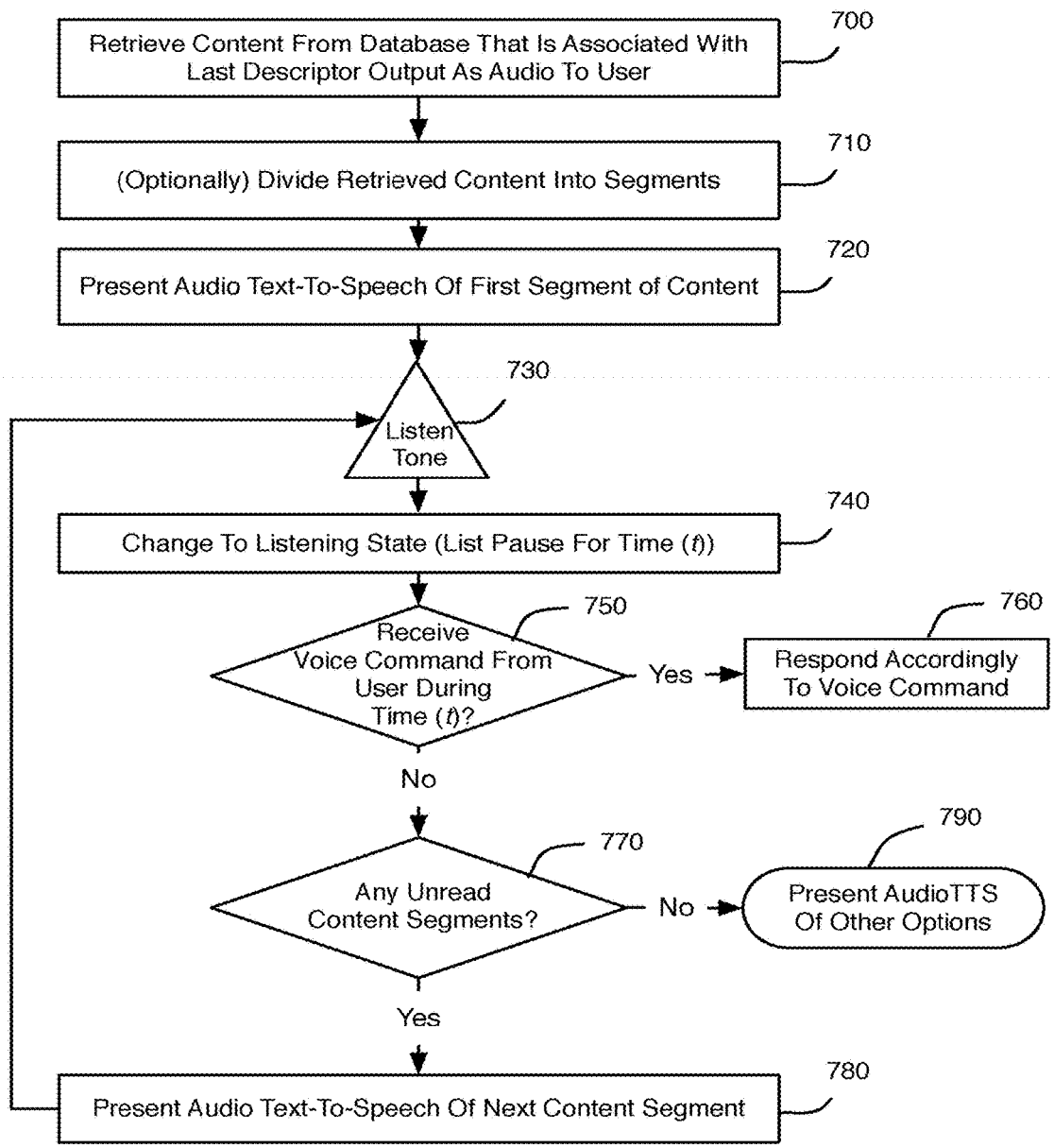
FIG. 7 is an illustrative example of a default action of FIG. 6.

An illustrative example of a default action is illustrated in FIG. 7. In this illustrative example, the default action (Step 660 of FIG. 6) may be (but is not limited to) retrieving the content (e.g., Data n) from the list of content 310 (FIG. 3) that is associated with last descriptor (e.g., Descriptor n) in the list of content descriptors 320 output to the user as text-to-speech through speaker(s) 242 (Step 700). Once retrieved, the processing unit(s) 210 may cause the TTS engine 226 and audio subsystem 240 to provide an audio output of the retrieved content (e.g., Data n) to the user through speaker(s) 242 (Step 730). In some embodiments, processing unit(s) 210 may divide the retrieved content (e.g., Data n) into segments (e.g., by paragraphs, number of words or lines, or the like) (Step 710) and cause the TTS engine 226 to provide an audio output of one segment (or group of segments) at a time (Step 720). After audio output of one segment (or a grouping of segments) of the retrieved content is completed, the processing unit(s) 210 may cause the audio subsystem 240 to output an audible listen tone through speaker(s) 242 (Step 730) and change to a List Pause listening state for a predefined time (t) to detect a response input from the user (Step 740).

If a response input from the user is received during the pause time (t) (Step 750), then the processing unit(s) 210 causes the STT engine 225 or other processing unit to convert the input from speech-to-text and the application software 224 responds according to the received response input (Step 760). By way of example only, the received response input may be other simple voice responses, such as (but is not limited to) RESTART, GO-BACK, SKIP, HELP, SETTINGS, STOP, etc.

If no response input is received during the pause time (t) (Step 750), then the processing unit(s) 210 determines whether there remain any segments of the retrieved content that have not been TTS output to the user through speaker(s) 242 (Step 770). If there are content segments remaining that have not been output to the user (Step 670), then the processing unit(s) 210 causes the TTS engine 226 to convert the next segment (or group of segments) of the retrieved content for audio output to the user through speaker(s) 242 (Step 780). The process in Steps 730-780 is repeated until either a response is received from the user through microphone(s) 244 (Step 750), or all (or a predefined number of) segments of the retrieved content have been converted from text-to-speech by the TTS engine 226 and output to the user through speaker(s) 242. In the latter case, the processing unit(s) 210 may optionally cause the TTS engine 226 to provide an audio output to the user through speaker(s) 242 as to other options from which the user may provide response input (Step 790).

Figure 8:
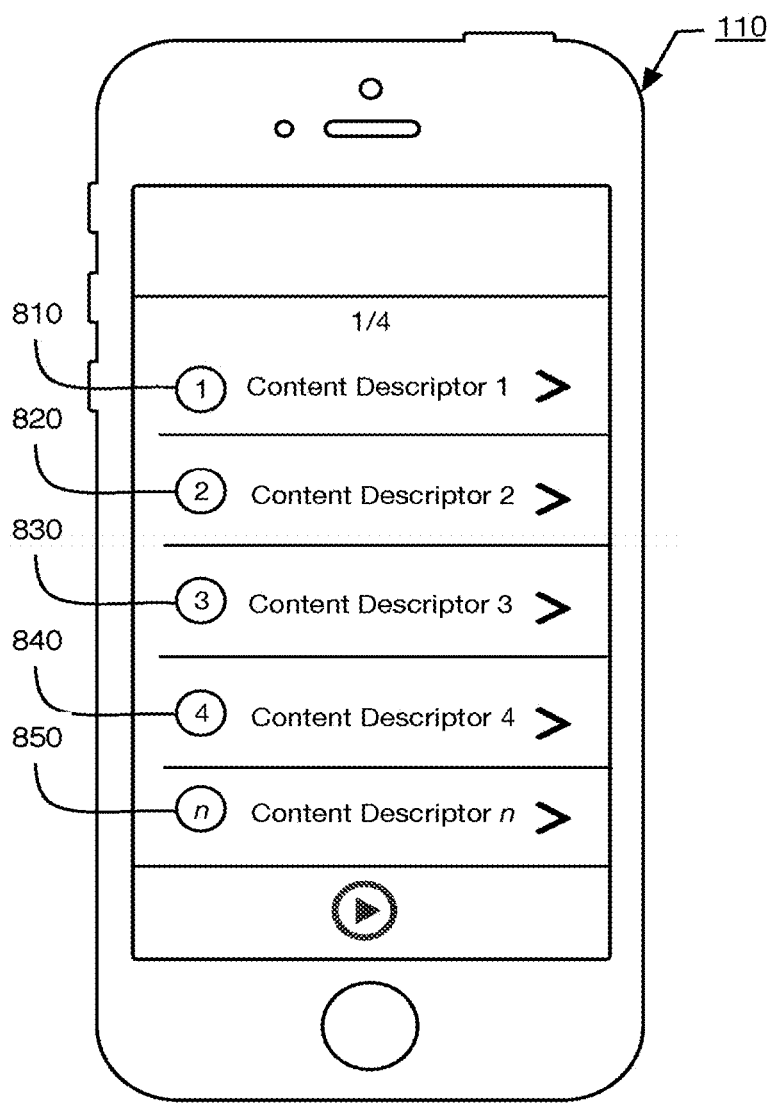
FIG. 8 is an example graphical user interface (GUI) displayed on a computing device to provide a visual display of all or a part of the list available for audio output in response to a user response.

FIG. 8 illustrates an example graphical user interface (GUI) displayed on a computing device 110 to provide a visual display of all or a part of the list of content descriptors 320 available for audio output in response to a user response with additional output beyond the viewing area of the display screen. It is to be understood that the simple affirmative response OS does not require a screen at all; however, when used on a device having a screen, a screen may be used to supplement the system and display content in a visual medium in addition to an auditory or other medium.

For instance, Content Descriptor 1 (810) corresponds to Descriptor 1 in the list of content descriptors 320 (FIG. 3). Content Descriptor 2 (820) corresponds to Descriptor 2 in the list of content descriptors 320 (FIG. 3). Content Descriptor 3 (830) corresponds to Descriptor 3 in the list of content descriptors 320 (FIG. 3). Content Descriptor 4 (840) corresponds to Descriptor 4 in the list of content descriptors 320 (FIG. 3). Content Descriptor n (850) corresponds to Descriptor n in the list of content descriptors 320 (FIG. 3).

Figure 9:
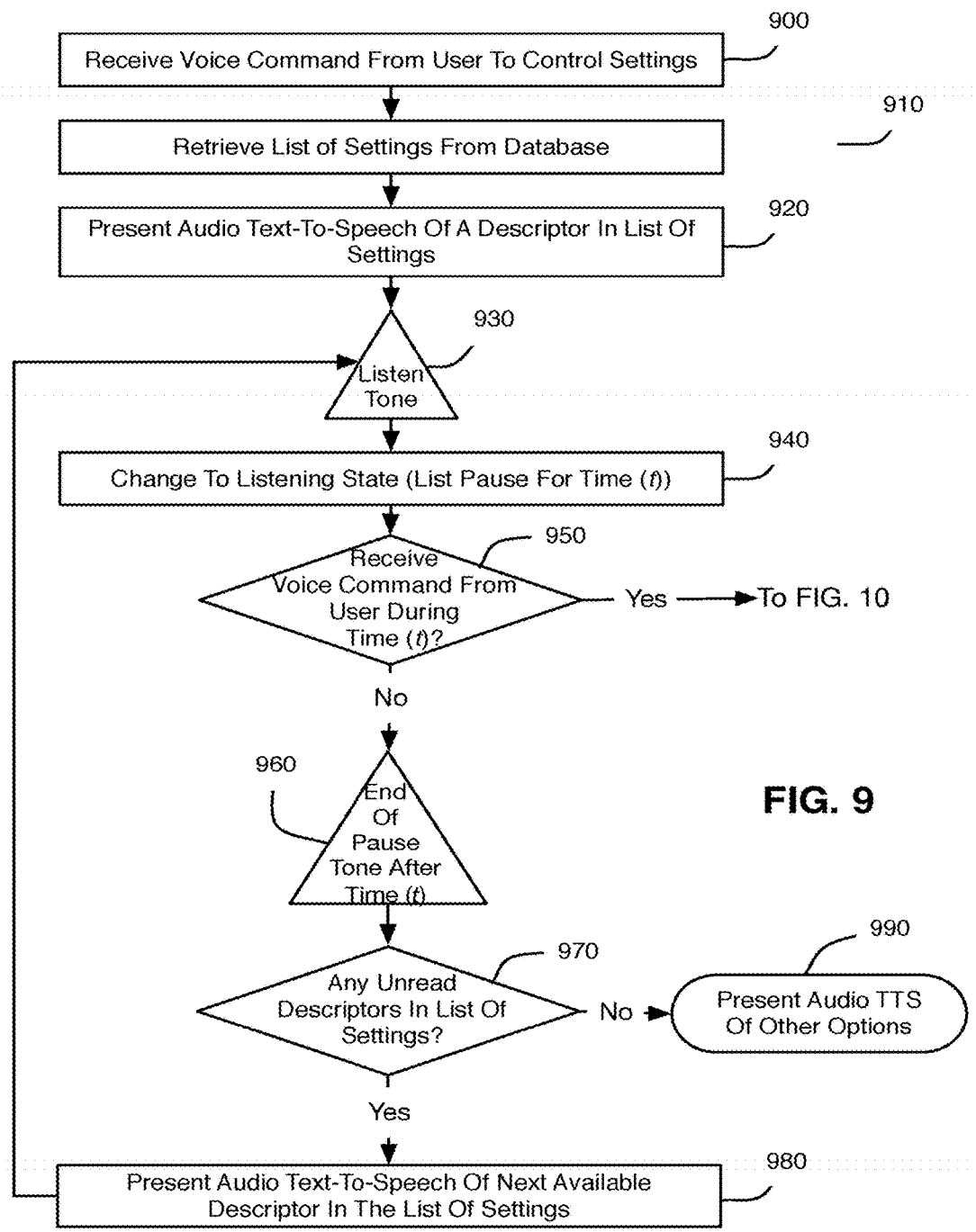
FIG. 9 is an illustrative flow diagram of another example implementation of the simple response-driven system.
Figure 10:
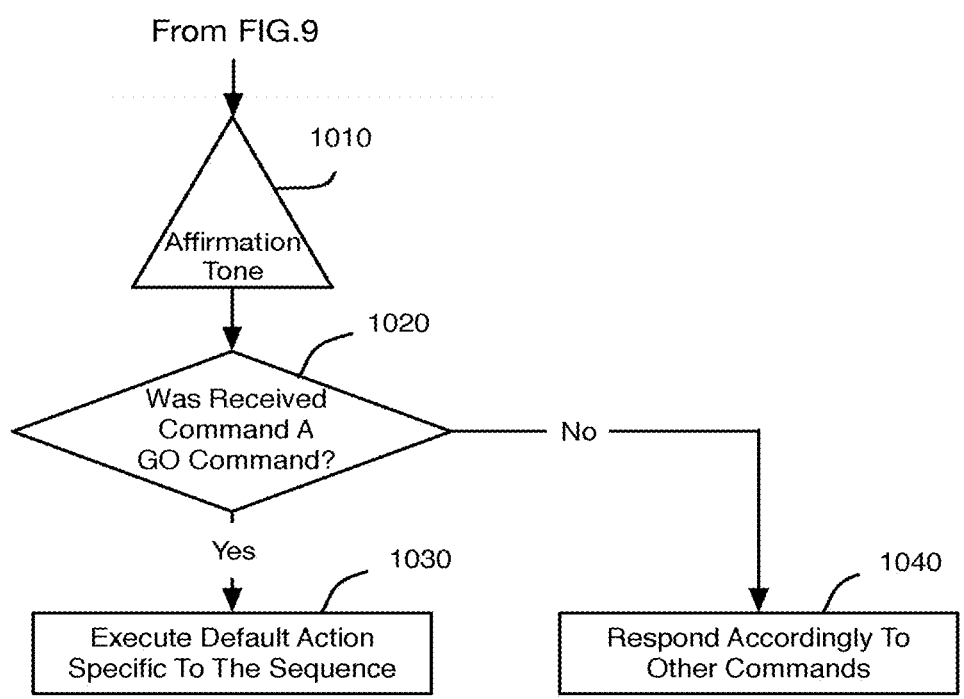
FIG. 10 is a continuation of the illustrative flow diagram of the example implementation of FIG. 9.

FIGS. 9 and 10 are an illustrative flow diagram of another example implementation of the simple affirmative response OS. In this illustrative example, a user of computing device 110 can control settings on the device using input responses. The user of computing device 110 may input a response such as, for example, "Settings," through microphone(s) 244 or other I/O device 255 (Step 900). The STT engine 225 or other processing unit converts the response input into text for processing by processing unit(s) 210, which determines that the user has selected "Settings." The application software 224 running on computing device 110 causes the processing unit(s) 210 to retrieve a list of settings from database 227 (Step 910). The list of settings may include short descriptors for each setting that a user can control on the computing device 110, such as (but not limited to) "Play Back Speed," "Pause Length," "Volume," "Choosing a Voice," "Language," etc. The processing unit(s) 210 may optionally cause the TTS engine 226 to provide an audio output to the user through speaker(s) 242, such as, for example, "After you hear the setting that you wish to select, say GO."

The processing unit(s) 210 causes the TTS engine 226 to convert the descriptor for one of the settings (e.g., the first descriptor in the list of settings, such as "Play Back Speed") in the list of settings for audio output to the user through speaker(s) 242 (Step 920). After audio output of the converted descriptor is completed, the processing unit(s) 210 causes an audible listen tone to be output through speaker(s) 242 of computing device 110 (Step 930). The application software 224 causes the processing unit(s) 210 to change to a listening state for a predefined pause time (t) to detect a response input from the user (Step 940). As discussed above, the predefined pause time (t) may be a fixed time (e.g., 2.5 seconds) programmed in the application software 224, or it can be a specific time (t) selected by the user of computing device 110 from a range of available pause times (e.g., from 1.5 seconds to 4 seconds).

If no input response is received during the predefined pause time (t) (Step 950), then the processing unit(s) 210 causes an audible end of pause tone to be output through speaker(s) 242 of computing device 110 (Step 960). The end of pause tone (Step 960) is preferably audibly distinct from the listen tone (Step 930) so that the user of computing device 110 can differentiate between them. After the end of pause tone (Step 960), the processing unit(s) 210 determines whether there are any additional descriptors in the list of settings that have not been text-to-speech output or otherwise presented to the user of the device 110 (Step 970). If yes, the processing unit(s) 210 causes the TTS engine 226 to convert the next descriptor in the list of settings (e.g., the second descriptor in the list of settings, such as "Pause Length") for audio output to the user through speaker(s) 242 (Step 980), and the processing unit(s) 210 again causes the audio subsystem 240 to output an audible listen tone through speaker(s) 242 of computing device 110 (Step 930). After the listen tone (Step 930), the application software 224 causes the processing unit(s) 210 to change to a List Pause listening state for the predefined pause time (t) to detect a response input from the user (Step 940).

The loop in Steps 930-980 continues until either a response input is received from the user of the computing device 110 (Step 950), a predefined number of descriptors have been output to the user, or there are no unread descriptors remaining in the list of settings (Step 970). If the latter, then the application software 224 causes the processing unit(s) to end the process, or provide an audio text-to-speech output to the user through the TTS engine 226, audio subsystem 240 and speaker(s) 242 of other options available for user selection, control or action (Step 990). These other options may be present to the user in the form of a TTS list of options, where the processing unit(s) 210 causes the audio subsystem 240 to output an option in the list through speaker(s) 242 followed by a List Pause for a time (t). If no response input is received after time (t), then the processing unit(s) 210 causes the audio subsystem 240 to output the next option in the list through speaker(s) 242. This process would continue until either the processing unit(s) 210 receive a GO response (or equivalent affirmative response) input from the user indicating the user's selection of the last option in the list that was output to the user through speaker(s) 242, or all options in the list have been TTS output to the user. In this manner, the user may, for instance, encounter a Wait Pause and remain in Settings or move to another mode in the application software 224 through the input of the affirmative, default GO voice response.

Referring to FIG. 10, if a response input is received within the pause time (t) from the user through microphone(s) 244 (Step 950 of FIG. 9), then the response input is converted to text by the STT engine 225 or other processing unit and the processing unit(s) 210 causes an audible affirmation tone to be output through speaker(s) 242 of computing device 110 (Step 1010). The affirmation tone is preferably audibly different from the listen tone and end of pause tone so that the user can differentiate from the other audible tones.

If the received response in Step 950 was a GO response (or equivalent affirmative response) (Step 1020), the application software 224 causes the processing unit(s) 210 to execute default action (Step 1030). Alternatively, if the received response was not a GO response (or equivalent affirmative response) (Step 1020), the application software 224 causes the processing unit(s) 210 to respond according to the other response received (Step 1040). Examples of other simple responses that may be available to the user in this illustrative example include (but are not limited to) STOP, GO-BACK, REPEAT, EXIT, etc.

By way of example only, the default action (Step 1030) might be (but is not limited to) providing an audio text-to-speech (TTS) output of another list of options available to the user with respect to the specific setting descriptor that was selected by the user with a GO response input. For instance, if the received voice response input was a GO response (Step 1020) following the audio text-to-speech output of the setting "Pause Length," then the application software 224 may cause the processing unit(s) 210 to retrieve a numerical list of times (t) (e.g., $t_1$, $t_2$, $t_3$, $t_4$, etc.) from which the user may select the desired pause length (t) (Step 910). The processing unit(s) 210 causes the TTS engine 226 to convert an initial pause-length time (e.g., $t_1$) in the retrieved list of pause-length times (t) for audio output to the user through speaker(s) 242. After audio output of the converted initial pause-length time is completed, the processing unit(s) 210 causes the audio subsystem 240 to output an audible listen tone through speaker(s) 242 of computing device 110 and changes to a List Pause listening state for the predefined or default pause-length time (t) to detect a response input from the user.

If no response input is received after the default pause time (t), then the processing unit(s) causes an end of pause tone to be output to the user through speaker(s) 242. If additional pause-length times (e.g., $t_2$, $t_3$, $t_4$, etc.) are available in the retrieved list of pause times, then the processing unit(s) 210 causes the TTS engine 226 to convert the next pause-length time (e.g., $t_2$) in the retrieved list of pause times for audio output to the user through speaker(s) 242, and the processing unit(s) 210 again causes the audio subsystem 240 to output an audible listen tone through speaker(s) 242 of the computing device 110.

After the listen tone (Step 930), the application software 224 causes the processing unit(s) 210 to change to a listening state for the default pause time (t) to detect an audible voice response from the user. This loop continues until either a GO response (or equivalent affirmative response) input is received from the user, which, in this example, may be to set the pause-length time (t) to the pause-length time (e.g., $t_2$) output to the user through speaker(s) 242 that immediately preceded the GO response.

In an alternative implementation, after the initial pause-length time (e.g., $t_1$) from the list of pause-length times (t) is output to the user through speaker(s) 242, the user could input a response, such as (but not limited to) "Shorter" or "Longer," through microphone(s) 244, which would be converted to text by the STT engine 225 and processed by the processing unit(s) 210. Depending on the received response input, the application software 224 may cause the processing unit(s) to select a shorter or longer List Pause length time (t) from the retrieved list of pause-length times for text-to-speech output to the user through speaker(s) 242. The application software 224 may continue to provide "shorter" or "longer" TTS until the user hears the desired pause-length time. Once the user hears the desired pause-length time, the user may input a GO response (or equivalent simple affirmative response) through microphone(s) 244 and the processing unit(s) 210 may set the List Pause length time (t) to the desired pause-length time (e.g., $t_2$) output to the user through speaker(s) 242 that immediately preceded the affirmative simple response (e.g., a GO response) input.

It is understood that the example above is illustrative and that the invention is not intended to be limited to a particular list stored in a database or specific voice responses. For example, instead of adjusting "Pause Length," the user may adjust the speed of the TTS output by the TTS engine 226 by providing a GO response input (Step 1020) following the audio text-to-speech output of the setting "Voice Speed." In that case, the application software 224 may cause the processing unit(s) 210 to retrieve a numerical list of voice speeds (v) and present the user with a TTS output of each speed (e.g., $v_1$, $v_2$, $v_3$, $v_4$, etc.) in the list, from which the user may select the desired speed (v) by providing the affirmative GO response (or an equivalent affirmative response) through microphone(s) 244 after hearing the audio TTS output of the desired speed (Step 910).

Figure 11A:
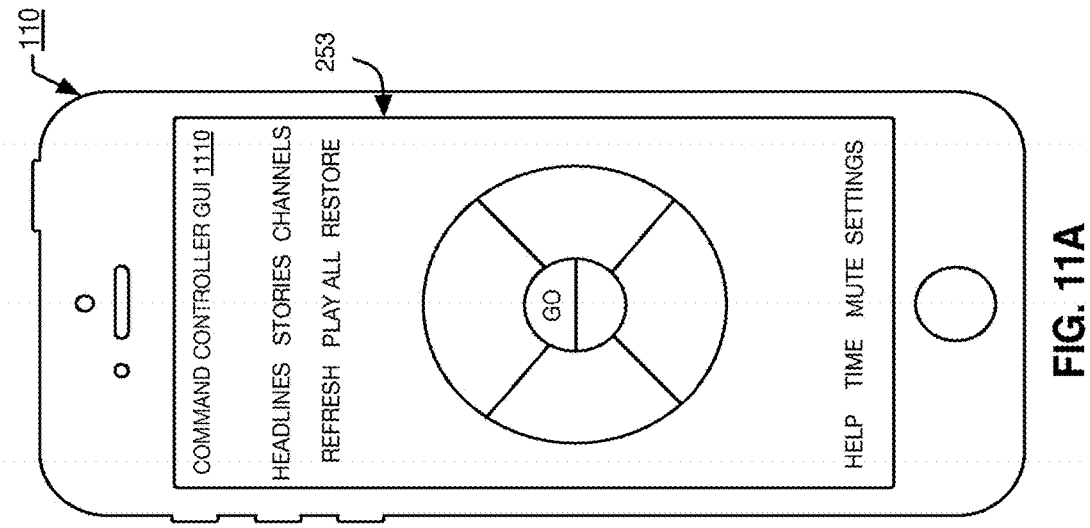
FIG. 11A illustrates the example command controller GUI of FIG. 11 displaying active responses available to a user.
Figure 11:
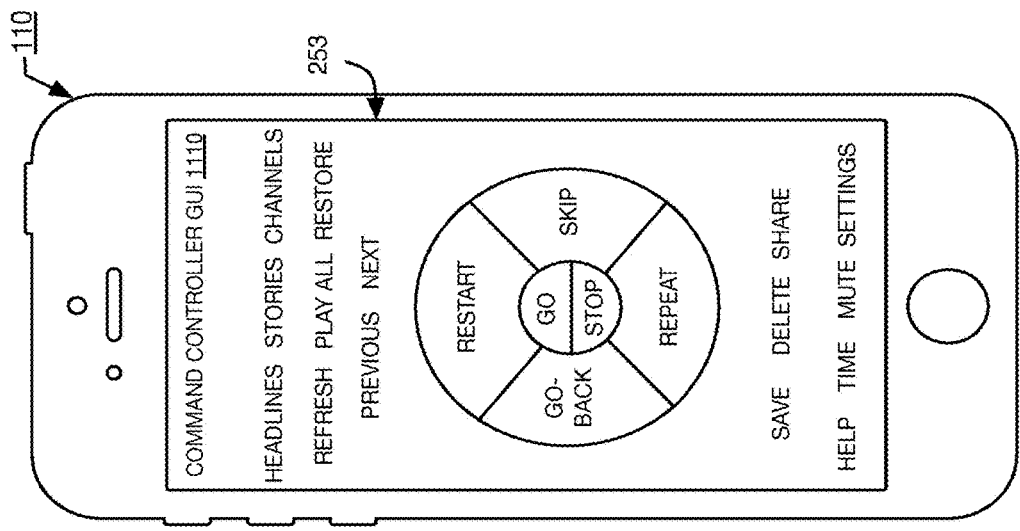
FIG. 11 is an example GUI of a command controller displayed on a computing device to provide a visual display of responses available to a user.

FIGS. 11 and 11A illustrate an example response controller GUI 1110 displayed on a touch screen 253 (or other display) of computing device 110. The response controller GUI 1110 provides a visual display of simple responses available to the user of computing device 110 and, preferably, of active simple responses available to the user as they change at different times or stages within the application software 224. The response controller GUI 1110 prompts the user of computing device 110 with the active responses differentiated from the inactive (or unavailable) responses to facilitate a response-driven system so that the user does not have to remember all responses available. Non-limiting examples for differentiating active responses from inactive (or unavailable) responses include (but are not limited to) only displaying the active responses on the visual display, presenting the active responses in a different color than the inactive responses, or presenting the active responses with a different apparent brightness than the inactive responses.

In some embodiments, the response controller GUI 1110 displayed on touch screen 253 of computing device 110 is in the form of a virtual remote control in which the text of active responses are displayed (as they change at different times or stages within the application software 224) to inform the user of the responses that are available at that time or sequence within application software 224. By way of example only, the response controller GUI 1110 of FIG. 11 may include (but is not limited to) a visual display of the text for the following illustrative simple responses available within application software 224: GO, STOP, GO BACK, RESTART, SKIP, REPEAT, SAVE, DELETE, SHARE, HELP, TIME, MUTE, SETTINGS, HEADLINES, STORIES, CHANNELS, REFRESH, PLAY ALL, RESTORE, PREVIOUS and NEXT. However, only certain responses (active responses) are available to the user of computing device 110 at different stages or times within application software 224. FIG. 11A illustrates, for emphasis, the response controller GUI 1110 with only the text for active responses displayed to the user at a given stage or time within application software 224. It is understood, however, that other techniques may be utilized to differentiate active and inactive responses on the visual display, such as (but not limited to) displaying active responses in a different color from inactive responses. In this manner, response controller GUI 1110 provides the user with a visual display that differentiates active responses that are available to the user from inactive responses that are unavailable to the user at any given time within the application software 224.

In some embodiments, the text of each active response displayed by the response controller GUI 1110 on touch screen 253 of computing device 110 may also function as a virtual button to allow the user to provide response inputs by tapping on the text of the desired response. By functioning as a manual interface, the response controller GUI 1110 provides the user of computing device 110 with a simplified interface and an alternative to providing a response input or navigating the graphical screen interface. The remote control style presentation of GUI 1110 may also facilitate the use of the system by users who are physically challenged and cannot use a keyboard or other manual input devices to interact with the system. Furthermore, for users who are visually impaired, response controller GUI 1110 may facilitate other systems, such as Apple, Inc.'s VoiceOver™ screen reader, whereby all buttons to control the system are labeled and accessible to visually impaired users for interaction with the system.

Figure 12:
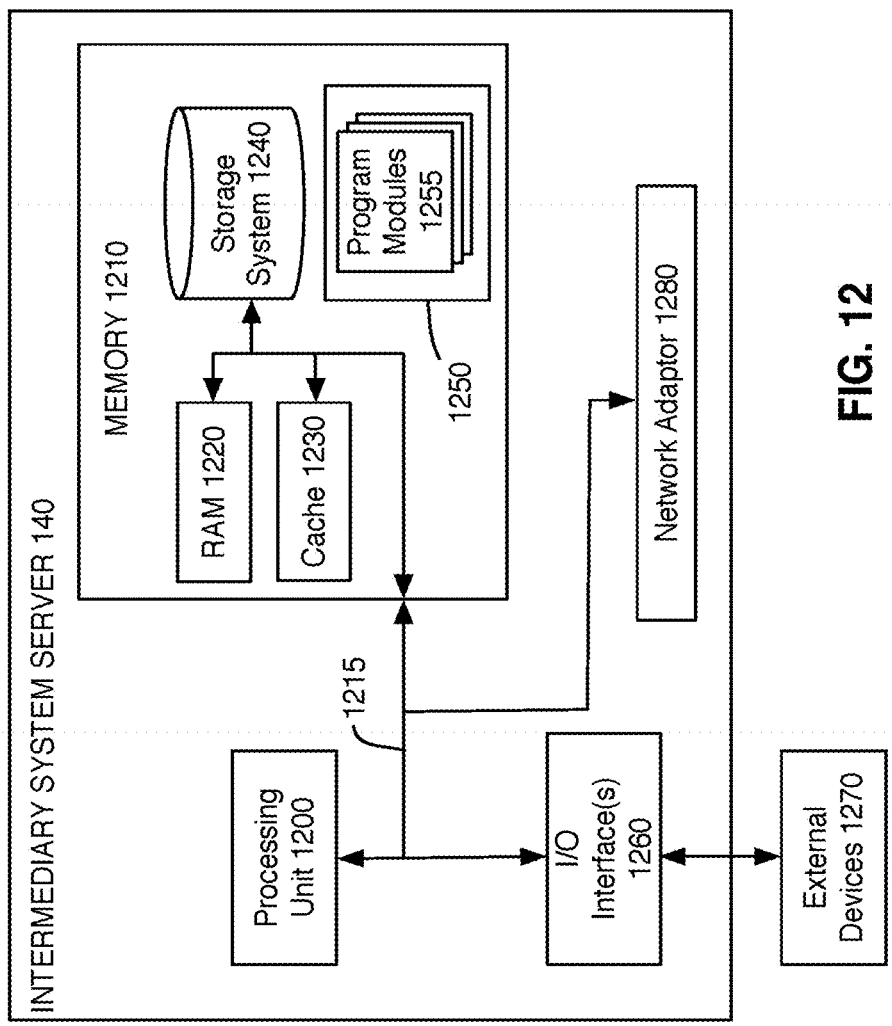
FIG. 12 is a block diagram of an optional system server that may be utilized to implement various features and processes described herein.

FIG. 12 is a high-level block diagram of a representative intermediate system server 140 that may be utilized to implement various features and processes described herein. Intermediate system server 140 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 12, optional intermediate system server 140 is illustrated in the form of a special purpose computer system. The components of intermediate system server 140 may include (but are not limited to) one or more processors or processing units 1200, a system memory 1210, and a bus 1215 that couples various system components including memory 1210 to processor 1200.

Bus 1215 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 1200 may execute computer programs stored in memory 1210. Any suitable programming language can be used to implement the routines of particular embodiments including C, C++, Java, Swift, assembly language, etc. Different programming techniques can be employed such as procedural or object oriented. The routines can execute on a single intermediate system server 140 or multiple intermediate system servers 140. Further, multiple processors 1200 may be used.

Intermediate system server 140 typically includes a variety of computer system readable media. Such media may be any available media that is accessible by intermediate system server 140, and it includes both volatile and non-volatile media, removable and non-removable media.

System memory 1210 can include computer system readable media in the form of volatile memory, such as random access memory (RAM) 1220 and/or cache memory 1230. Intermediate system server 140 may further include other removable/non-removable, volatile/non-volatile computer system storage media. By way of example only, storage system 1240 can be provided for reading from and writing to a non-removable, non-volatile magnetic media (not shown and typically referred to as a "hard drive" or "solid state drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1215 by one or more data media interfaces. As will be further depicted and described below, memory 1210 may include at least one program product having a set (e.g., at least one) of program modules that are configured to carry out the functions of embodiments described in this disclosure.

Program/utility 1250, having a set (at least one) of program modules 1255, may be stored in memory 1210 by way of example, and not limitation, as well as an operating system, one or more application software, other program modules, and program data. Each of the operating system, one or more application programs, other program modules, and program data or some combination thereof, may include an implementation of a networking environment.

Intermediate system server 140 may also communicate with one or more external devices 1270 such as a keyboard, a pointing device, a display, etc.; one or more devices that enable a user to interact with intermediate system server 140; and/or any devices (e.g., network card, modem, etc.) that enable intermediate system server 140 to communicate with one or more other computing devices. Such communication can occur via Input/Output (I/O) interface(s) 1260.

In addition, as described above, intermediate system server 140 can communicate with one or more networks 120, such as a local area network (LAN), a general wide area network (WAN) and/or a public network (e.g., the Internet) via network adaptor 1280. As depicted, network adaptor 1280 communicates with other components of intermediate system server 140 via bus 1215. It should be understood that although not shown, other hardware and/or software components could be used in conjunction with intermediate system server 140. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor;
a sensor coupled to the processor;
an electronic sensory presentation device; and
non-transitory memory storing:
an identification of a single, unique, system-wide, and context-independent affirmative action for use in modifying system parameters, selecting options, and selecting items of content;
system parameters, wherein each system parameter is associated with an identifier from a sequence of system parameter identifiers;
options, wherein each option is part of a list of possible commands or navigation options, and wherein each option is associated with an identifier from a sequence of option identifiers; and instructions that, when executed by the processor, cause the processor to:
store the items of content, wherein each item of content comprises a webpage, a book, an article, a text-based communication, an event stored in a calendar system, an audio file, or a video file, and is not one of the options or the system parameters;
store a sequence of identifiers of content, wherein each identifier of the sequence of identifiers of content is associated with an item of content;
enter a first list-pause cycle comprising:
a first list-pause that comprises:
outputting, via the sensory presentation device, an identifier from the sequence of identifiers of content; and
pausing a predetermined length of time;
repeating the first list-pause, each repetition of the first list-pause outputting a different next identifier from the sequence of identifiers of content, until determining, via input from the sensor, that the affirmative action has been performed during the pause of a most recent first list-pause; and
responsive to determining that the affirmative action has been performed during the pause of the most recent list-pause, outputting, via the sensory presentation device, an item of content associated with the identifier output during that most recent first list-pause;
enter a second list-pause cycle comprising:
a second list-pause comprising:
outputting, via the sensory presentation device, an identifier from the sequence of option identifiers; and
pausing a predetermined length of time;
repeating the second list-pause, each repetition of the second list-pause outputting a different next identifier from the sequence of option identifiers, until determining, via input from the sensor, that the single unique affirmative action has been performed during the pause of a most recent second list-pause; and
responsive to determining that the affirmative action has been performed during the pause of the most recent second list-pause, either navigating to an application mode or performing a command based on the option associated with the identifier output during that most recent second list-pause; and
enter a third list-pause cycle comprising:
a third list-pause comprising:
outputting, via the sensory presentation device, an identifier from the sequence of system parameter identifiers; and
pausing a predetermined length of time;
repeating the third list-pause, each repetition of the third list-pause outputting a different next identifier from the sequence of system parameter identifiers, until determining, via input from the sensor, that the single unique affirmative action has been performed during the pause of a most recent third list-pause; and
responsive to determining that the affirmative action has been performed during the pause of the most recent third list-pause, modifying the system parameter associated with the identifier output during that most recent third list-pause.

2. The system of claim 1, wherein the non-transitory memory further stores:
an identification of a unique, system-wide, and context-independent pause-initiation action; and
instructions that, when executed by the processor, further cause the processor to:
responsive to determining that the pause-initiation action has been performed during a pause of the first, second, or third list-pause, terminate repetition of list-pauses and enter a wait-pause mode.

3. The system of claim 2, wherein the non-transitory memory further stores:
an identification of a unique, system-wide, and context-independent options-initiation action; and
instructions that, when executed by the processor, further cause the processor to:
responsive to determining that the options-initiation action has been performed during either a list-pause cycle or the wait-pause mode, enter the second list-pause cycle.

4. The system of claim 1, wherein the electronic sensory presentation device is a speaker, and wherein each of the first, second, and third list-pauses further comprises, after outputting an identifier and before pausing the predetermined length of time, outputting, via the speaker, an audio signifier that a pause is beginning.

5. The system of claim 1, wherein the electronic sensory presentation device is a speaker, and wherein each of the first, second, and third list-pauses further comprise, after pausing the predetermined length of time, outputting, via the speaker, an audio signifier that the predetermined length of time has elapsed and a new list-pause will begin.

6. The system of claim 1, wherein the electronic sensory presentation device is a speaker, wherein at least one item of content comprises textual data, and wherein outputting the item of content comprises converting the content with a text-to-speech engine and playing the converted item of content.

7. The system of claim 6, wherein the textual data is received from a search engine, the sequence of identifiers of content is a sequence of webpage titles, and the items of content comprise a plurality of webpage contents.

8. The system of claim 1, wherein the sensor coupled to the processor is one of: a microphone, a camera, or an accelerometer.

9. The system of claim 1, wherein the electronic sensory presentation device is a speaker or a video screen.

10. A computer-implemented method for interaction between a human and a computing device, comprising:
storing an identification of a single, unique, system-wide, and context-independent affirmative action for use in modifying system parameters, selecting options, and selecting items of content;
storing a sequence of system parameters, and a sequence of system parameter identifiers, wherein each identifier from the sequence of system parameter identifiers is associated with a system parameter from the sequence of system parameters;
storing a sequence of options, wherein each option is part of a list of possible commands or navigation options, and a sequence of option identifiers, wherein each identifier from the sequence of option identifiers is associated with an option from the sequence of options;
storing a sequence of items of content and a sequence of identifiers of items of content, wherein each identifier of the sequence of identifiers of items of content is associated with an item of content from the sequence of items of content, and wherein each item of content comprises a webpage, a book, an article, a text-based communication, an event stored in a calendar system, an audio file, or a video file, and is not an option from the sequence of options or a system parameter from the sequence of system parameters;
entering a first list-pause cycle comprising:
a first list-pause that comprises:
outputting, via the computing device, an identifier from the sequence of identifiers of items of content; and
pausing a predetermined length of time;
repeating the first list-pause, each repetition of the first list-pause outputting a different next identifier from the sequence of identifiers of items of content, until determining the affirmative action has been performed during the pause of a most recent first list-pause; and
responsive to determining the affirmative action has been performed during the pause of the most recent first list-pause, outputting, via the computing device, the item of content from the sequence of items of content associated with the identifier output during that most recent first list-pause;
entering a second list-pause cycle comprising:
a second list-pause comprising:
outputting, via the sensory presentation device, an identifier from the sequence of option identifiers; and
pausing a predetermined length of time;
repeating the second list-pause, each repetition of the second list-pause outputting a different next identifier from the sequence of option identifiers, until determining that the single unique affirmative action has been performed during the pause of a most recent second list-pause; and
responsive to determining that the affirmative action has been performed during the pause of the most recent second list-pause, either navigating to an application mode or performing a command based on the option from the sequence of options associated with the identifier output during that most recent second list-pause; and
entering a third list-pause cycle comprising:
a third list-pause comprising:
outputting, via the sensory presentation device, an identifier from the sequence of system parameter identifiers; and
pausing a predetermined length of time;
repeating the third list-pause, each repetition of the third list-pause outputting a different next identifier from the sequence of system parameter identifiers, until determining that the single unique affirmative action has been performed during the pause of a most recent third list-pause; and
responsive to determining that the affirmative action has been performed during the pause of the most recent third list-pause, modifying the system parameter associated with the identifier output during that most recent third list-pause.

11. The method of claim 10, further comprising:
storing an identification of a unique, system-wide, and context-independent pause-initiation action; and
responsive to determining that the pause-initiation action has been performed during a pause of the first, second, or third list-pause, terminating repetition of list-pauses and entering a wait-pause mode.

12. The method of claim 11, further comprising:
  storing an identification of a unique, system-wide, and context-independent options-initiation action; and
  responsive to determining that the options-initiation action has been performed during either a list-pause cycle or the wait-pause mode, entering the second list-pause cycle.

13. The method of claim 10, wherein each of the first, second, and third list-pauses further comprises, after outputting an identifier and before pausing the predetermined length of time, outputting an audio signifier that a pause is beginning.

14. The method of claim 10, wherein each of the first, second, and third list-pauses further comprises, after pausing the predetermined length of time, outputting an audio signifier that the predetermined length of time has elapsed and a new list-pause will begin.

15. The method of claim 10, wherein an item of content comprises textual data, and wherein outputting the item of content comprises converting the item of content with a text-to-speech engine and playing the converted item of content.

16. The method of claim 15, wherein the textual data is received from a search engine, the sequence of identifiers is a sequence of webpage titles, and the items of content comprise a plurality of webpage contents.

17. The method of claim 10, wherein the affirmative action is sensed by one of: a microphone, a camera, or an accelerometer.

18. The method of claim 10, wherein an item of content is output via a speaker or a video screen.

* * * * *